United States Patent
Song et al.

(10) Patent No.: US 11,455,519 B2
(45) Date of Patent: Sep. 27, 2022

(54) METHOD FOR ESTIMATING OUTPUT NEURON SPIKES BASED ON INPUT-OUTPUT SPIKE DATA

(71) Applicant: University of Southern California, Los Angeles, CA (US)

(72) Inventors: Dong Song, Walnut, CA (US); Brian S. Robinson, Culver City, CA (US); Theodore W. Berger, Rancho Palos Verdes, CA (US)

(73) Assignee: University of Southern California, Los Angeles, CA (US)

( * ) Notice: Subject to any disclaimer, the term of this patent is extended or adjusted under 35 U.S.C. 154(b) by 1013 days.

(21) Appl. No.: 16/005,613

(22) Filed: Jun. 11, 2018

(65) Prior Publication Data
US 2018/0357529 A1    Dec. 13, 2018

Related U.S. Application Data

(60) Provisional application No. 62/517,752, filed on Jun. 9, 2017.

(51) Int. Cl.
*G06N 3/04* (2006.01)
*G06N 3/08* (2006.01)
*G06N 20/10* (2019.01)

(52) U.S. Cl.
CPC ............... *G06N 3/049* (2013.01); *G06N 3/08* (2013.01); *G06N 20/10* (2019.01)

(58) Field of Classification Search
CPC .......... G06N 3/04; G06N 3/049; G06N 20/10; G06N 3/08
See application file for complete search history.

(56) References Cited

U.S. PATENT DOCUMENTS

| | | | | |
|---|---|---|---|---|
| 2009/0089022 A1* | 4/2009 | Song | ...................... | G05B 13/04 703/2 |
| 2013/0073491 A1* | 3/2013 | Izhikevich | ............. | G06N 3/049 706/15 |
| 2017/0286828 A1* | 10/2017 | Smith | .................... | G06N 3/049 |

OTHER PUBLICATIONS

Oakymchuk et al. "Simplified spiking neural network architecture and STDP learning algorithm applied to image classification", Eurasip J. Image and Video Processing, 2015, pages: 11.*
Wittenberg, G. M., & Wang, S. S. H. (2006). Malleability of spike-timing-dependent plasticity at the CA3-CA1 synapse. Journal of Neuroscience, 26(24), 6610-6617.
Zhou, H., Li, L., & Zhu, H. (2013). Tensor regression with applications in neuroimaging data analysis. Journal of the American Statistical Association, 108(502), 540-552.
(Continued)

*Primary Examiner* — Li Wu Chang
(74) *Attorney, Agent, or Firm* — Snell & Wilmer L.L.P.

(57) ABSTRACT

A method for estimating output neuron spikes based on input-output spike data that includes input spike data and corresponding output spike data includes formulating, using a controller, a weight value that characterizes plastic properties of a neuron based on the input-output spike data. The method further includes receiving, by the controller, an input spike train. The method further includes estimating, using the controller, an output spike train that corresponds to the input spike train by applying the weight value to a feedforward kernel that estimates the output spike train based on the input spike train and the weight value.

20 Claims, 13 Drawing Sheets

(56) References Cited

OTHER PUBLICATIONS

Ahrens, M. B., Linden, J. F., & Sahani, M. (2008). Nonlinearities and contextual influences in auditory cortical responses modeled with multilinear spectrotemporal methods. Journal of Neuroscience, 28(8), 1929-1942.

Ahrens, M. B., Paninski, L., & Sahani, M. (2008). Inferring input nonlinearities in neural encoding models. Network, 19 (1), 35-67.

Berger, T., Song, D., Chan, R. H. M., Marmarelis, V. Z., LaCoss, J., Wills, J., . . . Granacki, J. J. (2012). A hippocampal cognitive prosthesis: Multi-input, multioutput nonlinear modeling and VLSI implementation. IEEE Transactions on Neural Systems and Rehabilitation Engineering, 20(2), 198-211.

Bi, G. Q., & Poo, M. M. (1998). Synaptic modifications in cultured hippocampal neurons: Dependence on spike timing synaptic strength, and postsynaptic cell type. Journal of Neuroscience, 18(24), 10464 10472.

Billings, G., & Van Rossum, M. C. W. (2009). Memory retention and spike-timingdependent plasticity. Journal of Neurophysiology, 101(6), 2775-2788.

Caporale, N., & Dan, Y. (2008). Spike timing-dependent plasticity: A Hebbian learning rule. Annual Review of Neuroscience, 31, 25-46.

Chan, R. H. M., Song, D., Goonawardena, A. V., Bough, S., Sesay, J., Hampson, R. E., . . . Berger, T. W. (2011). Tracking the changes of hippocampal population nonlinear dynamics in rats learning a memory-dependent task. In Proceedings of the Annual International Conference of the IEEE Engineering in Medicine and Biology Society (pp. 3326-3329). Piscataway, NJ: IEEE.

Citri, A., & Malenka, R. C. (2008). Synaptic plasticity: Multiple forms, functions, and mechanisms. Neuropsychopharmacology, 33(1), 18-41.

Clopath, C., B using, L., Vasilaki, E., & Gerstner, W. (2010). Connectivity reflects coding: A model of voltage-based STDP with homeostasis. Nature Neuroscience, 13(3), 344-352.

de Boor, C. (1972). On calculating with B-splines. Journal of Approximation Theory, 6, 50-62.

Eden, U. T., Frank, L. M., Barbieri, R., Solo, V., & Brown, E. N. (2004). Dynamic analysis of neural encoding by point process adaptive filtering. Neural Computation, 16(5), 971-998.

Eldawlatly, S., Jin, R., & Oweiss, K. G. (2009). Identifying functional connectivity in large-scale neural ensemble recordings: A multiscale data mining approach. Neural Computation, 21(2), 450-477.

Feldman, D. E. (2012). The spike-timing dependence of plasticity. Neuron, 75(4), 556-571.

Froemke, R. C., & Dan, Y. (2002). Spike-timing-dependent synaptic modification induced by natural spike trains. Nature, 416(6879), 433-438.

Froemke, R. C., Debanne, D., & Bi, G. Q. (2010). Temporal modulation of spike-timing-dependent plasticity. Frontiers in Synaptic Neuroscience, 2(19), 1-17.

Gjorgjieva, J., Clopath, C., Audet, J., & Pfister, J.-P. (2011). A triplet spike-timing-dependent plasticity model generalizes the Bienenstock-Cooper-Munro rule to higher-order spatiotemporal correlations. Proceedings of the National Academy of Sciences of the United States of America, 108(48), 19383-19388.

Gustafsson, B., Asztely, F., Hanse, E., & Wigstrom, H. (1989). Onset characteristics of long-term potentiation in the guinea-pig hippocampal CA1 region in vitro. European Journal of Neuroscience, 1(4), 382-394.

Izhikevich, E. M., & Desai, N. S. (2003). Relating STDP to BCM. Neural Computation, 15(7), 1511-1523.

Lim, S., McKee, J. L., Woloszyn, L., Amit, Y., Freedman, D. J., Sheinberg, D. L., & Brunel, N. (2015). Inferring learning rules fromdistributions of firing rates. Nature Neuroscience, 18(12), 1804-1810.

Linderman, S., Stock, C. H.,&Adams, R. P. (2014).Aframework for studying synaptic plasticity with neural spike train data. In Z. Ghahramani, M.Welling, C. Cortes, N. D. Lawrence, & K. Q.Weinberger (Eds.), Advances in neural Information processing systems, 27 (pp. 2330-2338). Red Hook, NY: Curran. [Abstract].

Lisman, J. E., & Grace, A. A. (2005). The hippocampal-VTA loop: Controlling the entry of information into long-term memory. Neuron, 46(5), 703-713.

Loewenstein, Y., Yanover, U., & Rumpel, S. (2015). Predicting the dynamics of network connectivity in the neocortex. Journal of Neuroscience, 35(36), 12535-12544.

Markram, H., Lübke, J., Frotscher, M., & Sakmann, B. (1997). Regulation of synaptic efficacy by coincidence of postsynaptic APs and EPSPs. Science, 275(5297), 213-215.

Marmarelis, V. Z. (1993). Identification of nonlinear biological systems using Laguerre expansions of kernels. Annals of Biomedical Engineering, 21(6), 573-589.

Marmarelis, V. Z. (2004). Nonlinear dynamic modeling of physiological systems Hoboken, NJ: Wiley. Chapter 2.1 Volterra Models, 31-37.

Martin, S. J., Grimwood, P. D., & Morris, R. G. M. (2000). Synaptic plasticity and memory: An evaluation of the hypothesis. Annual Reviews in Neuroscience, 23, 649-711.

McCullagh, P., & Nelder, J. A. (1989). Generalized linear models. London: Chapman and Hall. Chapter 2.2 The components of a generalized linear model, 26-32.

Morrison, A., Diesmann, M., & Gerstner, W. (2008). Phenomenological models of synaptic plasticity based on spike timing. Biological Cybernetics, 98(6), 459-478.

Nelder, J.,&Mead, R. (1965).Asimplex method for function minimization. Computer Journal, 7(4), 308-313.

Okatan, M.,Wilson, M., & Brown, E. (2005). Analyzing functional connectivity using a network likelihood model of ensemble neural spiking activity. Neural Computation,17(9), 1927-1961.

Pfister, J.-P., & Gerstner, W. (2006). Triplets of spikes in a model of spike timing-dependent plasticity. Journal of Neuroscience, 26(38), 9673-9682.

Pozzorini, C., Mensi, S., Hagens, O., Naud, R., Koch, C., & Gerstner,W. (2015). Automated high-throughput characterization of single neurons by means of simplified spiking models. PLoS Computational Biology, 11(6).

Redondo, R. L., & Morris, R. G. M. (2011). Making memories last: The synaptic tagging and capture hypothesis. Nature Reviews Neuroscience, 12(1), 17-30.

Robinson, B. S., Song, D., & Berger, T. W. (2013). Laguerre-Volterra identification of spike-timing-dependent plasticity from spiking activity: A simulation study. In Proceedings of the Annual International Conference of the IEEE Engineering in Medicine and Biology Society (pp. 5578-5581). Piscataway, NJ: IEEE.

Rubin, J., Lee, D. D., & Sompolinsky, H. (2001). Equilibrium properties of temporally asymmetric Hebbian plasticity. Physical Review Letters, 86(2), 364-367.

Sayer, R. J., Friedlander, M. J., & Redman, S. J. (1990). The time course and amplitude of EPSPs evoked at synapses between pairs of CA3/CA1 neurons in the hippocampal slice. Journal of Neuroscience, 70, 828-838.

Shouval, H. Z., Bear, M. F., & Cooper, L. N. (2002). A unified model of NMDA receptor-dependent bidirectional synaptic plasticity. Proceedings of the National Academy of Sciences of the United States of America, 99(16), 10831-10836.

Song, D., Chan, R. H. M., Marmarelis, V. Z., Hampson, R. E., Deadwyler, S. A., & Berger, T.W. (2007). Nonlinear dynamic modeling of spike train transformations for hippocampal-cortical prostheses. IEEE Transactions on Biomedical Engineering, 54(6), 1053-1066.

Song, D., Chan, R. H. M., Marmarelis, V. Z., Hampson, R. E., Deadwyler, S. A., & Berger, T. W. (2009). Nonlinear modeling of neural population dynamics for hippocampal prostheses. Neural Networks, 22(9), 1340-1351.

Song, D., Chan, R. H. M., Robinson, B. S.,Marmarelis, V. Z., Opris, I., Hampson, R.E., . . . Berger, T. W. (2015). Identification of functional synaptic plasticity from spiking activities using nonlinear dynamical modeling. Journal of Neuroscience Methods, 244, 123-135.

(56) References Cited

OTHER PUBLICATIONS

Song, D., Wang, H., Tu, C. Y., Marmarelis, V. Z., Hampson, R. E., Deadwyler, S. A., & Berger, T.W. (2013). Identification of sparse neural functional connectivity using penalized likelihood estimation and basis functions. Journal of Computational Neuroscience, 35(3), 335-357.

Song, S., Miller, K. D., & Abbott, L. F. (2000). Competitive Hebbian learning through spike-timing-dependent synaptic plasticity. Nature Neuroscience, 3(9), 919-926.

Song, S., Sjöström, P. J., Reigl, M., Nelson, S., & Chklovskii, D. B. (2005). Highly nonrandom features of synaptic connectivity in local cortical circuits PLoS Biology, 3(3), e68.

Stevenson, I. H., & Kording, K. P. (2011). Inferring spike-timing-dependent plasticity from spike train data. In J. Shawe-Taylor, R. S. Zemel, P. L. Bartlett, F. Pereira, & K. Q. Weinberger (Eds.), Advances in neural information processing systems (pp. 2582-2590). Red Hook, NY: Curran. [Abstract].

Stevenson, I. H., Rebesco, J. M., Miller, L. E., & Kording, K. P. (2008). Inferring functional connections between neurons. Current Opinion in Neurobiology, 18(6), 582-588.

Truccolo, W., Eden, U. T., Fellows, M. R., Donoghue, J. P., & Brown, E. N. (2005). A point process framework for relating neural spiking activity to spiking history, neural ensemble, and extrinsic covariate effects. Journal of Neurophysiology, 93(2), 1074-1089.

Turrigiano, G. G., Leslie, K. R., Desai, N. S., Rutherford, L. C., & Nelson, S. B. (1998). Activity-dependent scaling of quantal amplitude in neocortical neurons. Nature, 391(6670), 892-896.

Van Rossum, M. C., Bi, G. Q., & Turrigiano, G. G. (2000). Stable Hebbian learning from spike timing-dependent plasticity. Journal of Neuroscience, 20(23), 8812-8821.

Wang, H. X., Gerkin, R. C., Nauen, D. W., & Bi, G. Q. (2005). Coactivation and timing-dependent integration of synaptic potentiation and depression. Nature Neuroscience, 8(2), 187-193.

Wedderburn, R. W. M. (1976). On the existence and uniqueness of the maximum likelihood estimates for certain generalized linear models. Biometrika, 63(1), 27-32.

* cited by examiner

METHOD FOR ESTIMATING OUTPUT NEURON SPIKES BASED ON INPUT-OUTPUT SPIKE DATA

CROSS-REFERENCE TO RELATED APPLICATIONS

This application claims the benefit and priority of U.S. Provisional Application No. 62/517,752, entitled "NON-STATIONARY MIMO MODEL FOR PROSTHESIS," filed on Jun. 9, 2017, the entire disclosure of which is hereby incorporated by reference herein in its entirety.

STATEMENT REGARDING GOVERNMENT RIGHTS

This invention was made with Government support under Contract No. N66001-14-C-4016, awarded by the Defense Advanced Research Projects Agency (DARPA); and with support under Contract No. 5P41EB001978-32, awarded by the National Institutes of Health (NIH). The Government has certain rights in this invention.

BACKGROUND

1. Field

The present disclosure relates to systems and methods for estimating output neuron spikes based on training input-output spike data.

2. Description of the Related Art

Characterization of long-term activity-dependent plasticity from behaviorally driven spiking activity is important for understanding the underlying mechanisms of learning and memory. Previous approaches have focused on a spiking neuron model that generates an output spike train based on an input spike train that mimics stationary functions of a neuron. However, neurons exhibit plasticity functions as well, and it is important to be able to interpret these plasticity functions in order to create prostheses that properly simulate neuron activity. Therefore, systems and methods for estimating output neuron spikes using stationary as well as plasticity functions are desirable.

SUMMARY

Described herein is a method for estimating output neuron spikes based on input-output spike data that includes input spike data and corresponding output spike data. The method includes formulating, using a controller, a weight value that characterizes plastic properties of a neuron based on the input-output spike data. The method further includes receiving, by the controller, an input spike train. The method further includes estimating, using the controller, an output spike train that corresponds to the input spike train by applying the weight value to a feedforward kernel that estimates the output spike train based on the input spike train and the weight value.

Also disclosed is a method for formulating a computational framework for estimating a functional spike-timing-dependent plasticity (STDP). The method includes formulating a flexible spiking neuron model structure with STDP including stationary functions that characterize stationary properties of a neuron and plastic functions that characterize plastic properties of the neuron. The method further includes performing a simulation using the flexible spiking neuron model structure with STDP to generate input-output spike data that includes input spike data and corresponding output spike data. The method further includes formulating an estimation technique using a generalized multilinear model (GMLM) structure. The method further includes applying the estimation technique using the input-output spike data to identify parameters that increase a likelihood of observing output spiking activity.

Also disclosed is a system for estimating output neuron spikes. The system includes an input device or an input port configured to receive training input-output spike data that includes training input spike data and corresponding training output spike data that is used for training a model of a neuron. The system also includes a controller configured to create the model of the neuron by formulating a weight value that characterizes plastic properties of the neuron based on the training input-output spike data, receiving an input spike train, and estimating an output spike train that corresponds to the input spike train by applying the weight value to a feedforward kernel that estimates the output spike train based on the input spike train and the weight value.

BRIEF DESCRIPTION OF THE DRAWINGS

Other systems, methods, features, and advantages of the present invention will be or will become apparent to one of ordinary skill in the art upon examination of the following figures and detailed description. Additional figures are provided in the accompanying Appendix and described therein.

DETAILED DESCRIPTION

Figure 1:
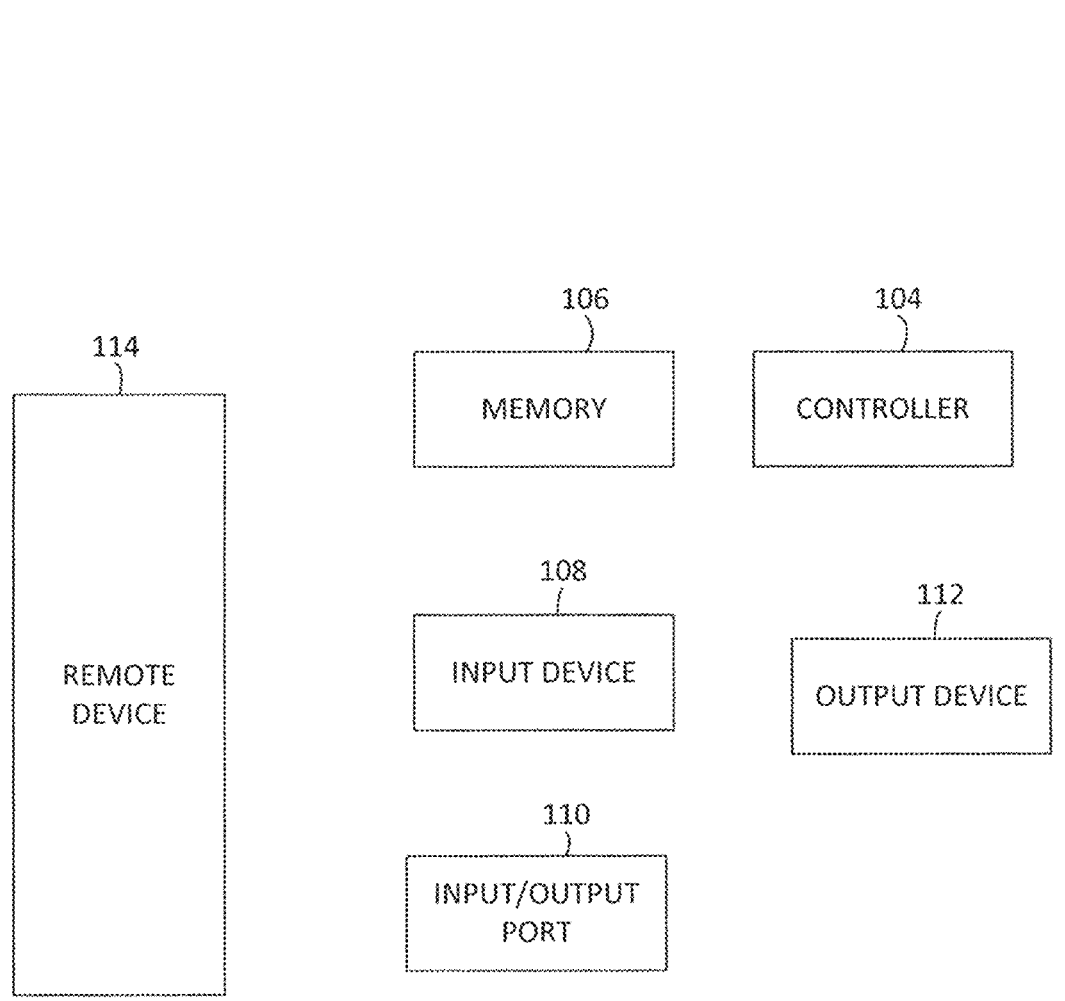
FIG. 1 is a block diagram illustrating a system for estimating output neuron spikes based on input-output spike data according to an embodiment of the present disclosure.

Persistent changes in synaptic strength induced by patterns of neural activity (i.e., long-term synaptic plasticity (LTSP)) are widely implicated as an underlying mechanism for learning and memory formation. Identifying the exact nature of the activity dependency of LTSP remains an important research front in understanding the computational roles of these synaptic modifications and their underlying biological mechanisms. There has been abundant experimental evidence for spike-timing-dependent plasticity (STDP), where changes in synaptic weight can be predicted from the relative presynaptic and postsynaptic spike timing on the order of tens of milliseconds. The observed features of the STDP function that relates relative spike timing to synaptic modification are variable and depend on neural region, neuron type, and experimental protocol. However, characterization of STDP in the mammalian brain during behavior has been mostly indirect, relying largely on analyses of neural responses evoked by environmental stimuli as opposed to behaviorally driven, spontaneous spiking activity. The present disclosure provides a computational framework for quantifying STDP during behavior by estimating a functional plasticity rule solely from spiking activity. This framework can be contrasted to other general plasticity identification approaches that use different types of observations, such as time-varying dendritic spine image observations, or different types of activity dependence, such as rate-based plasticity models.

Neural spiking data can be utilized to infer the functional connectivity between neurons by statistically estimating how the firing of input neurons contribute to an output neuron's conditional firing probability. In the present formulation, identification of the neural functional connectivity is equivalent to the estimation of feedforward nonlinear dynamics of a multiple-input, multiple-output (MIMO) neural ensemble model from spiking activity with a generalized functional additive model. This MIMO model has been extended to a time-varying MIMO model using a point-process adaptive filtering technique to track the changes of neural functional connectivity strength over time. The present disclosure seeks to identify a plasticity rule that can explain how spiking activity influences changes of neural functional connectivity strength. This is referred to as a functional plasticity rule instead of a synaptic plasticity rule because identification relies on analyses of causal relations between spiking activity and functional connectivity strength changes, as opposed to direct measures of the postsynaptic responses after plasticity induction stimuli in typical STDP studies. Specifically, previous neural functional connectivity identification techniques are extended by incorporating a functional STDP rule that characterizes how relative input and output spiking activity influence functional connectivity strength over time.

Several aspects of the synaptic plasticity rule need to be considered to formulate the model structure and develop the estimation procedures. First, as in most STDP implementations, an important component of the plasticity rule is the function that relates the relative timing of pre- and postsynaptic spike pairs to changes in synaptic strength. The present disclosure focuses on the identification of such a pair-wise plasticity rule for simplicity, although the form of the pair-wise STDP function identification can be readily modified to study triplet-wise or even higher-order effects. Second, changes in synaptic strength caused by spikes are not immediate; instead, they occur over a prolonged period on the order of tens of seconds and then become stabilized. In order to capture these dynamics, a function that describes the induction time course of plasticity is included in the model. Third, the dependence of the plasticity rule on the current synaptic weight has a significant effect on the dynamics, stability, and functionality of the plasticity rule. This weight dependence adds an extra source of nonlinearity to the system, which yields significant challenges that have to be addressed for plasticity rule identification and precludes the direct use of existing solvers.

The main goals of the present disclosure are to formulate a computational framework for estimating the functional STDP rule using spiking data and to validate the estimation method using simulated data generated from a spiking neuron model with a wide range of plasticity parameters. Here, the model takes the form of a generalized multilinear model (GMLM) to facilitate the nonlinear estimation of all model coefficients from spiking data in one neuron model dimension and two plasticity model dimensions. This is an extension of the generalized Volterra model (GVM) used in previous studies, where each GMLM dimension is a GVM. The GVM is equivalent to a cascade of a Volterra model and a link function, which enables coefficient estimation with well-understood algorithms and convergence properties inherited from the generalized linear model (GLM). Basis function expansion is also used to further reduce the number of parameters to estimate. One complicating factor in the model estimation is that the change in synaptic weight is dependent on the current synaptic weight, in addition to the input-output temporal spiking pattern. This weight dependence adds a nonlinearity that cannot be directly identified using standard GLM estimation procedures such as the reweighted least-squares method. An iterative unconstrained optimization procedure is therefore introduced to overcome this estimation difficulty associated with weight dependence.

Related identification approaches that have been used for neural modeling include the generalized bilinear model, and multilinear modeling without a link function. More recently, the theoretical properties of models equivalent to a generalized multilinear model have been explored in other fields. These works highlight the benefits of using multilinear formulations to drastically reduce the amount of parameters to estimate over a full-rank model.

In related plasticity identification from spiking activity work, Stevenson and Kording (2011) use a generalized bilinear model for estimating an additive STDP rule. Assumptions in this work include immediate plasticity induction, as well as a forgetting factor where all weight changes decay with a time constant of 60 seconds to overcome weight instability. Here, prolonged plasticity induction over tens of seconds is captured with a GMLM dimension. Furthermore, achieving stability through multiplicative weight dependence without imposing a forgetting factor and tractably estimating the resultant nonlinearities is a central contribution of the work presented herein. Additional works present a promising approach to simultaneously infer connectivity, weight trajectories, and underlying learning rules with a particle Markov chain Monte Carlo (pMCMC) technique from spike train data. This pMCMC approach, however, is demonstrated only on minute-long simulations where all weight trajectories increase or decrease monotonically or saturate.

Referring now to FIG. 1, a system 100 for estimating output neuron spikes (i.e., for simulating operation of a neuron) is shown. The system 100 includes a controller 104, a memory 106, an input device 108, an input/output port 110, an output device 112, and potentially a remote device 114.

The controller 104 may include any controller or processor. The controller 104 may refer to any logic device capable of receiving one or more input and outputting one or more output. For example, the controller 104 may include a PI controller, a processor, an application specific integrated circuit (ASIC), a digital signal processor (DSP), a field-programmable gate array (FPGA), or the like. In some embodiments, the controller may be specifically designed to process relatively large amounts of data.

The memory 106 may include any non-transitory memory known in the art. The memory 106 may store data usable by the controller 104 to perform operations. For example, the memory 106 may store a model of a neuron such that controller 106 may simulate operation of the neuron by performing a simulation using the model stored in the memory 106.

The input device 108 may include any input device capable of receiving user input. For example, the input device 108 may include a keyboard, a mouse, a touchscreen, or the like.

The input/output port 110 may include any port capable of communicating with the remote device 114 via a wired or wireless protocol. For example, the input/output port 110 may be capable of communicating via Ethernet, Wi-Fi, any 802.11 protocol, Bluetooth, FireWire, USB, or the like.

The output device 112 may include any output device capable of outputting data. For example, the output device 112 may include a speaker, a display, a touchscreen, a haptic motor, or the like.

The remote device 114 may include any device capable of communicating with the controller 114 via the input/output port 110. For example, the remote device 114 may include a computer or server located in a location remote from the controller 104, may be a cloud server, or the like.

As will be described in greater detail below, the system 100 is capable of creating a model of a neuron and estimating output neuron spikes based on received input. In particular, the controller 104 may receive training input-output spike data that includes training input spike data and corresponding training output spike data. The training spike data may be received by the input device 108 or via the input/output port 110. The controller 104 may then generate or update a model of a neuron based on the training spike data.

After the model has been trained using the training spike data, the controller 104 may receive an input spike train. The controller 104 may then estimate an output spike train based on the input spike train and the model. The controller 104 may control the output device 112 to output the estimated output spike train.

Figure 2:
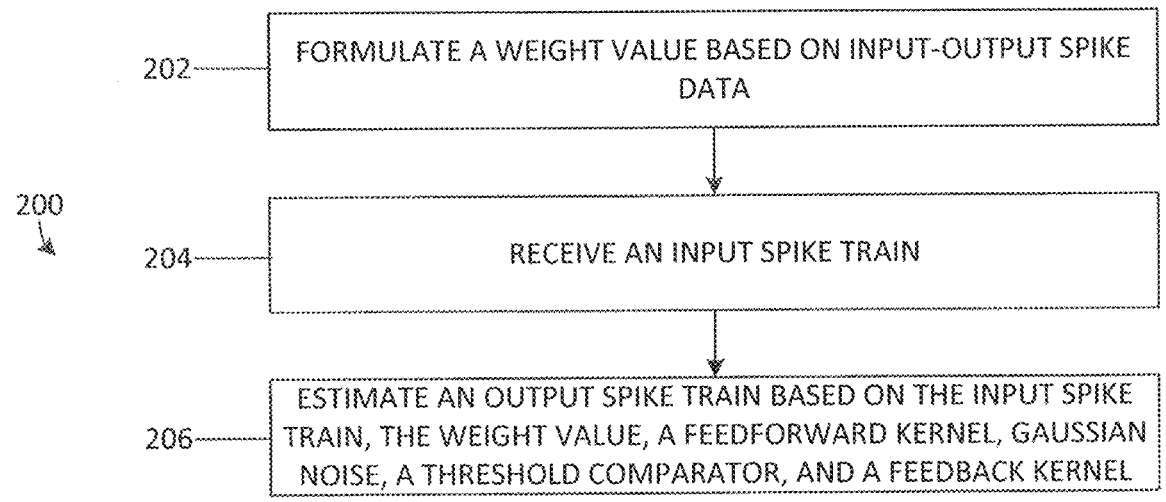
FIG. 2 is a flowchart illustrating a method for estimating output neuron spikes based on input-output spike data according to an embodiment of the present disclosure.

Referring now to FIG. 2, a method 200 may be performed by a system similar to the system 100 of FIG. 1 to estimate an output spike train. In particular and in block 202, a controller may formulate a weight value based on input-output spike data that includes input spike data and corresponding output spike data. The weight value may characterize plastic properties of a neuron based on the input-output spike data. Formulating the weight value may include formulating plastic amplitude properties along with plastic induction properties of the neuron. Formulating the weight value may further include formulating the weight value to be a positive value regardless of whether an input spike occurs prior to a corresponding output spike, or vice versa. Formulating the weight value may further include formulating a first set of plastic properties in response to an input spike occurring prior to a corresponding output spike, and formulating a second set of plastic properties in response to the input spike occurring after the corresponding output spike. An amplitude of change in the weight value may be characterized based on a difference in timing between an input spike and a corresponding output spike.

In block 204, the controller may receive an input spike train. For example, the input spike train may be received from an input device or via an input/output port.

In block 206, the controller may estimate an output spike train based on the input spike train, the weight value, a feedforward kernel, Gaussian noise, a threshold comparator, and a feedback kernel. This estimation will be described with further detail below.

Figure 3:
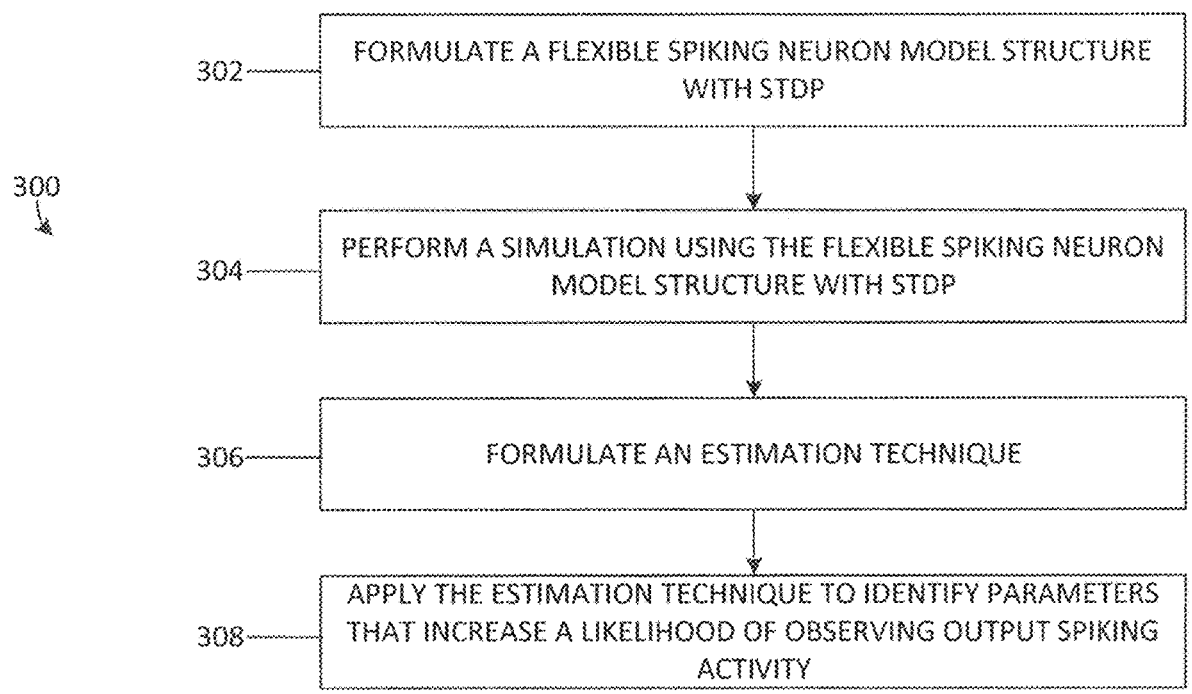
FIG. 3 is a flowchart illustrating a method for formulating a computational framework for estimating a functional spike-timing-dependent plasticity (STDP) weighting according to an embodiment of the present disclosure.

Turning now to FIG. 3, a method 300 for formulating a computational framework for estimating a functional spike-timing-dependent-plasticity (STDP) is shown. In block 302, a flexible spiking neuron model structure with STDP may be formulated. This structure may include stationary functions that characterize stationary properties of a neuron and plastic functions that characterize plastic properties of the neuron. The model structure may generate an output spike in response to a membrane potential reaching or exceeding a threshold potential. The model structure may model an amplitude of change in weight as a function of the intervals between input-output spike pairs.

In some embodiments, the model structure may model the neuron based on multiple combinations of input spikes and output spikes. Such modeling may provide advantages over creating a model structure using only spike pairs because it may provide greater accuracy of the model of the neuron.

The model structure may be formulated to create a sum of a feedforward component, a feedback component, and a Gaussian white noise component. The sum of these components may be compared to a threshold potential to create output spike data.

The model structure may further measure intervals between input spikes and corresponding output spikes (input-output spike pairs) and determine changes in weight of the input-output spike pairs based on the intervals. The model structure may further determine synaptic weight fluctuations.

In block 304, a simulation may be performed using the flexible spiking neuron model structure with STD.

In block 306, an estimation technique may be formulated. For example, the estimation technique may be formulated using a generalized multilinear model (GMLM) structure. In some embodiments, formulating the estimation technique includes formulating the estimation technique to approximate each of the plastic functions as a weighted summation of a set of basis functions.

In block 308, the estimation technique may be applied to identify parameters that increase the likelihood of observing output spiking activity. The estimation technique may be iteratively applied to address nonlinear dependence of model parameters on synaptic weight.

Turning now to a more specific description, a stochastic spiking neuron model that generates an output spike whenever its membrane potential, w, crosses a threshold, $\theta$, is shown in Equation 1.

$$y = \begin{cases} 0 & \text{when } w < \theta \\ 1 & \text{when } |w| \geq \theta \end{cases} \quad \text{Equation 1}$$

The membrane potential is composed of a summation of postsynaptic potential, u, a spike-triggered after-potential, a, and Gaussian white noise, ε, as shown in Equation 2 below.

$$w = u + a + \varepsilon \quad \text{Equation 2:}$$

The postsynaptic potential, u, is calculated by convolving input spike trains, $x_n$, with feedforward functions, $k_n$, multiplied by their respective synaptic weight $g_n$, as shown in Equation 3 below.

$$u(t) = \sum_{n=1}^{N} \sum_{\tau=0}^{M_k} k_n(\tau) x_n(t-\tau) g_u(t) \quad \text{Equation 3}$$

In Equation 3, $M_k$ refers to the memory length of the feedforward function and N is the number of inputs. Every output spike generates an after-potential, a, according to a feedback function, h, as shown in Equation 4 below.

$$a(t) = \sum_{\tau=0}^{M_h} h(\tau) y(t-\tau) \quad \text{Equation 4}$$

Figure 4:
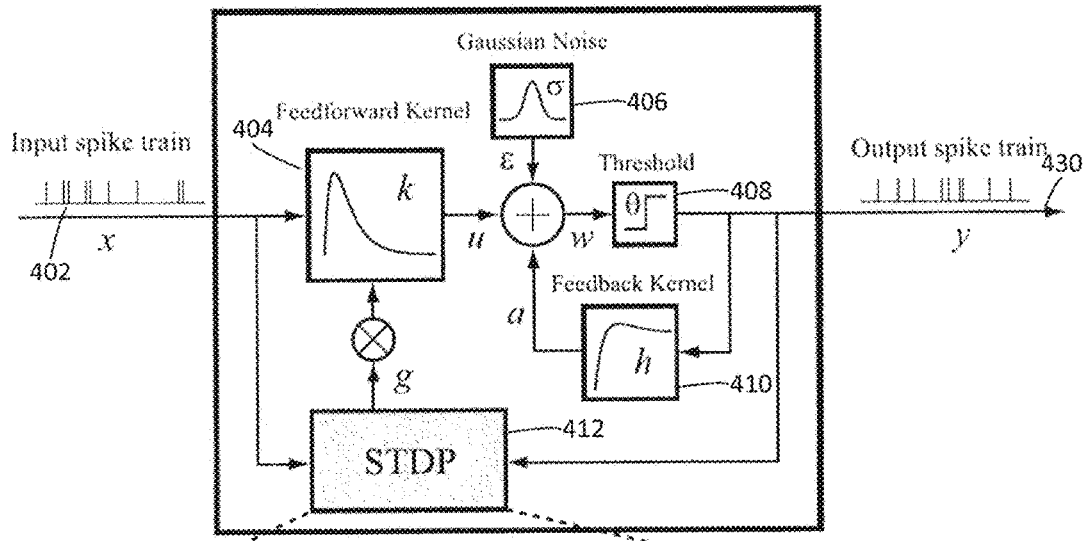
FIG. 4 is a drawing illustrating a spiking neuron model using spike-timing-dependent plasticity (STDP) weighting according to an embodiment of the present disclosure.
Figure 4:
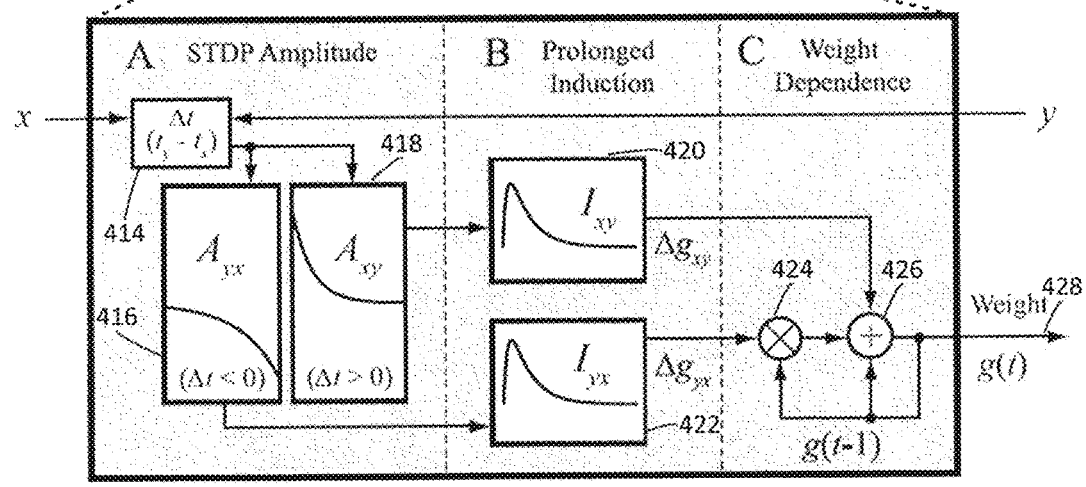

The Gaussian white noise has a standard deviation σ and captures system uncertainty caused by both the intrinsic neuronal noise and unobserved, uncorrelated input. The spiking neuron model structure 400 is shown in FIG. 4. For example, the spiking neuron model structure 400 may be modeled by the controller 104 of FIG. 1 and stored in the memory 106 of FIG. 1.

By defining u, a, and σ relative to θ=1, the firing probability, $P_f$, at any time can be expressed as shown in Equation 5 below.

$$P_f(t) = \Phi\left(\frac{-1 + u(t) + a(t)}{\sigma}\right) \quad \text{Equation 5}$$

In Equation 5, Φ( ) is the cumulative distribution function of the standard normal distribution. This model quantifies functional connectivity (i.e., input-triggered changes in conditional firing probability), which cannot be strictly interpreted as physiological monosynaptic connections.

The STDP rule models the amplitude of the change in weight as a function of the intervals between input-output spike pairs ($t_y - t_x = \Delta t$) and the time course of the weight change induction. Since the STDP amplitude function is discontinuous around Δt=0, the model includes two separate amplitude functions $A_{xy}$ for Δt>0 and $A_{yx}$ for Δt<0 (see FIG. 4). The induction of plasticity occurs over a much longer timescale than the tens of milliseconds of the plasticity amplitude functions. The present disclosure models plasticity induction with two functions: $I_{xy}$ for Δt>0 and $I_{yx}$ for Δt<0 (see FIG. 4). The timescale of the implemented plasticity induction functions is on the timescale of tens of seconds as shown in experimental results for long-term potentiation. The changes in weight are represented by $\Delta g_{xy}$ for Δt>0 and $\Delta g_{yx}$ for Δt<0 as shown in Equations 6 and 7 below.

$$\Delta g_{xy}(t) = \sum_{\tau_x=1}^{M_I} \sum_{\tau_y=0}^{\tau_x-1} A_{xy}(\tau_x - \tau_y) I_{xy}(\tau_y) x(t-\tau_x) y(t-\tau_y) \quad \text{Equation 6}$$

$$\Delta g_{yx}(t) = \sum_{\tau_y=1}^{M_I} \sum_{\tau_x=0}^{\tau_y-1} A_{yx}(\tau_x - \tau_y) I_{yx}(\tau_y) x(t-\tau_x) y(t-\tau_y) \quad \text{Equation 7}$$

Referring to FIG. 4, the spiking neuron model 400 includes a feedforward component, a feedback component, and a Gaussian white noise component that are summed and thresholded to create output spiking. For each input-output spike pair, the difference in timing determines the amplitude of the associated change in weight. All changes in weight have a prolonged induction time course defined by functions $I_{xy}$ and $I_{yx}$. If Δt<0, the associated weight change is multiplicatively weight dependent, where $\Delta g_{yx}$ is multiplied by the weight in the previous time step.

Although the present disclosure refers to input/output spike pairs, the model 400 may be used to analyze multiple combinations of input spikes and output spikes simultaneously.

Essentially, the contribution to $\Delta g_{xy}$ (or $\Delta g_{yx}$) from each spike pair is calculated by convolving the induction function $I_{xy}$ (or $I_{yx}$) by the latter of the two spike times and scaling by $A_{xy}(\Delta t)$ (or $A_{yx}(\Delta t)$). Amplitude functions $A_{yx}$ and $A_{xy}$ are defined over memory windows $[-M_A, 0]$, $[0, M_A]$, respectively, and zero elsewhere, while induction functions $I_{xy}$ and $I_{yx}$ are defined from $[0, M_I]$. The model makes a simplifying assumption that the synaptic weight, g(t), instantaneously influences the output spiking probability and does not explicitly include a delay that would be caused by membrane filtering. The effective delay that would be caused by membrane filtering is less than 100 milliseconds, which is negligible compared to the slow changes in weight in the present model due to prolonged induction on the timescale of tens of seconds.

The weight dependence of the plasticity rule and system stability must also be considered. A purely additive rule, where $\Delta g = \Delta g_{xy} + \Delta g_{yx}$, is unstable; every weight increase will increase the likelihood of subsequent input spikes to cause output spikes, which leads to an even larger increase in synaptic weight. Stability can be imposed with an additive rule by implementing hard minimum and maximum bounds; however, the dynamics of such a rule cause rapid bimodal saturation to upper and lower bounds. Such a bimodal distribution in synaptic weights is not supported in experimental studies. An alternative way to achieve system stability is to make the effective change in weight be multiplied by the current weight (multiplicative) instead of being additive. Experimental results demonstrate that a multiplicative update rule provides a better fit to depression data, while an additive rule is better than a multiplicative rule for potentiation data. Multiplicative weight modification for the depressive portion of the rule $\Delta g_{yx}$ and additive weight modification for the potentiation portion $\Delta g_{xy}$ can be seen in FIG. 4 and is incorporated into the model as shown below in Equation 8.

$$g(t) = g(t-1) + \Delta g_{xy}(t) + \Delta g_{yx}(t) g(t-1) \quad \text{Equation 8:}$$

The weight dependence on the depressive portion of the rule ensures stability because at low weights, the effective depression is diminished, and at high weights, the effective depression is enhanced. The stable levels of synaptic weight over time are determined by the relative magnitudes of $\Delta g_{xy}$ vs. $\Delta g_{yx}$. (See FIG. 5 for a visualization of how spike pairs influence synaptic weight according to the defined STDP rule.)

Figure 5:
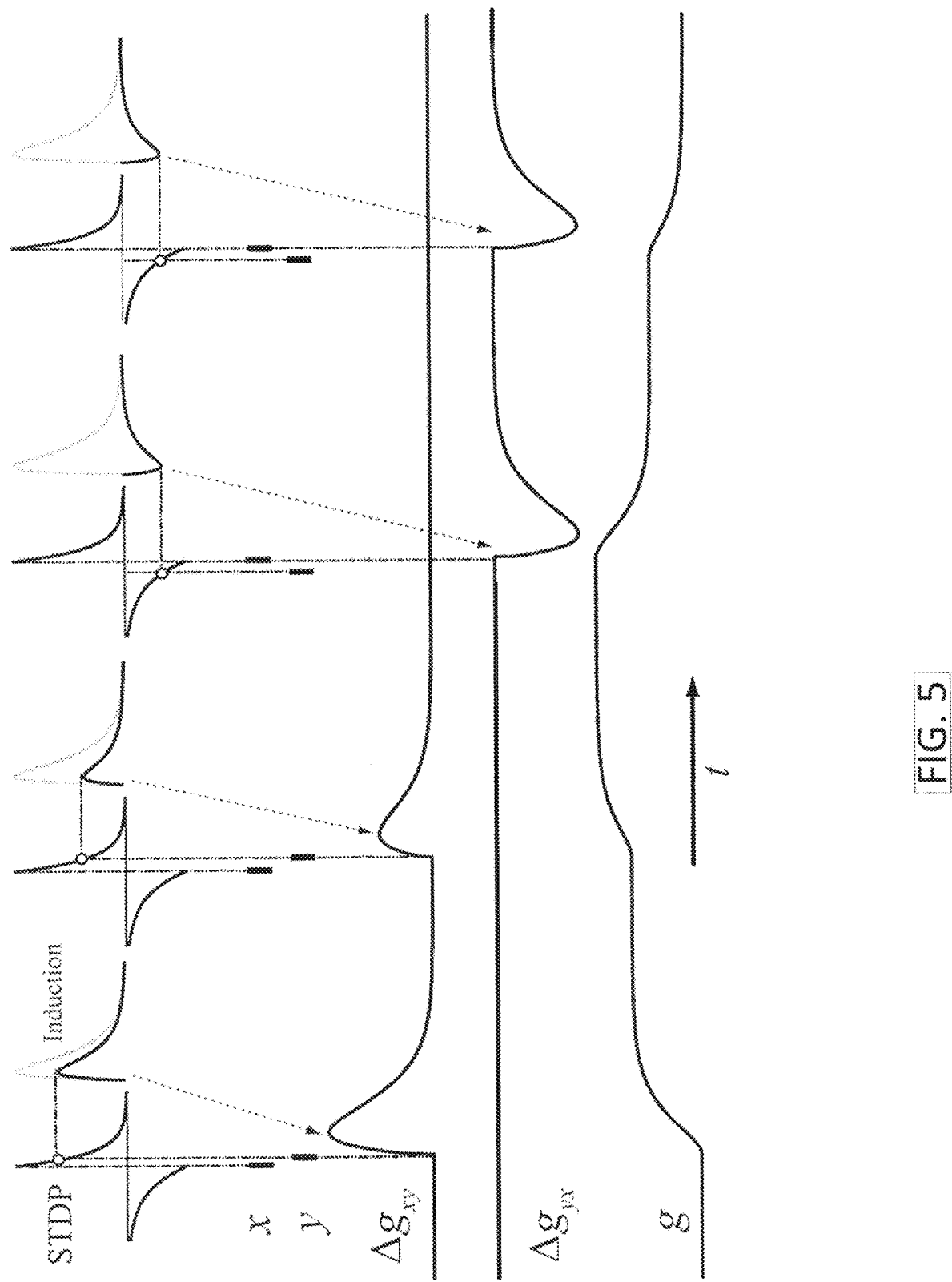
FIG. 5 is a graph illustrating spike-timing-dependent plasticity (STDP) weighting according to an embodiment of the present disclosure.

FIG. 5 illustrates a demonstration of the STDP rule. In the top portion of the figure, the relationship between input-output spike pair timing and resultant $\Delta g_{xy}$ and $\Delta g_{yx}$ traces are shown. For clarity, STDP amplitude and induction timescales are not drawn to scale. In the implemented rule, interspike timing intervals of interest for the STDP amplitude function are on the order of tens of milliseconds versus an induction time period of tens of seconds. In the bottom portion of FIG. 5, the summation of $\Delta g_{xy}$ and $\Delta g_{yx}$ over time leads to a prolonged induction of weight change in g. The relative spike timing between the third and fourth spike pair and associated $\Delta g_{yx}$ are equivalent; however, due to weight dependence, the contribution of $\Delta g_{yx}$ is multiplied by a smaller weight value for the fourth pair and therefore leads to a smaller change in g.

Next, simulation of the spiking neuron and STDP model will be described. First, the spiking neuron and STDP model are run to generate input-output spike data for the estimation. Simulations of the spiking neuron and STDP model are run with a default configuration and several parameter permutations to test the robustness of model identification. Simulations are performed with 1 millisecond (1 ms) time steps with a default duration of 67 minutes (67 min, 4000 s). Input spike trains, x, are generated by resampling interspike intervals from a set of microelectrode recorded hippocampal CA3 data, which has an average firing frequency of 0.76 hertz (0.76 Hz). In simulations with the default configuration, clusters of input spikes trigger changes in synaptic weight that fluctuate around a central value (see FIG. 6).

Figure 6:
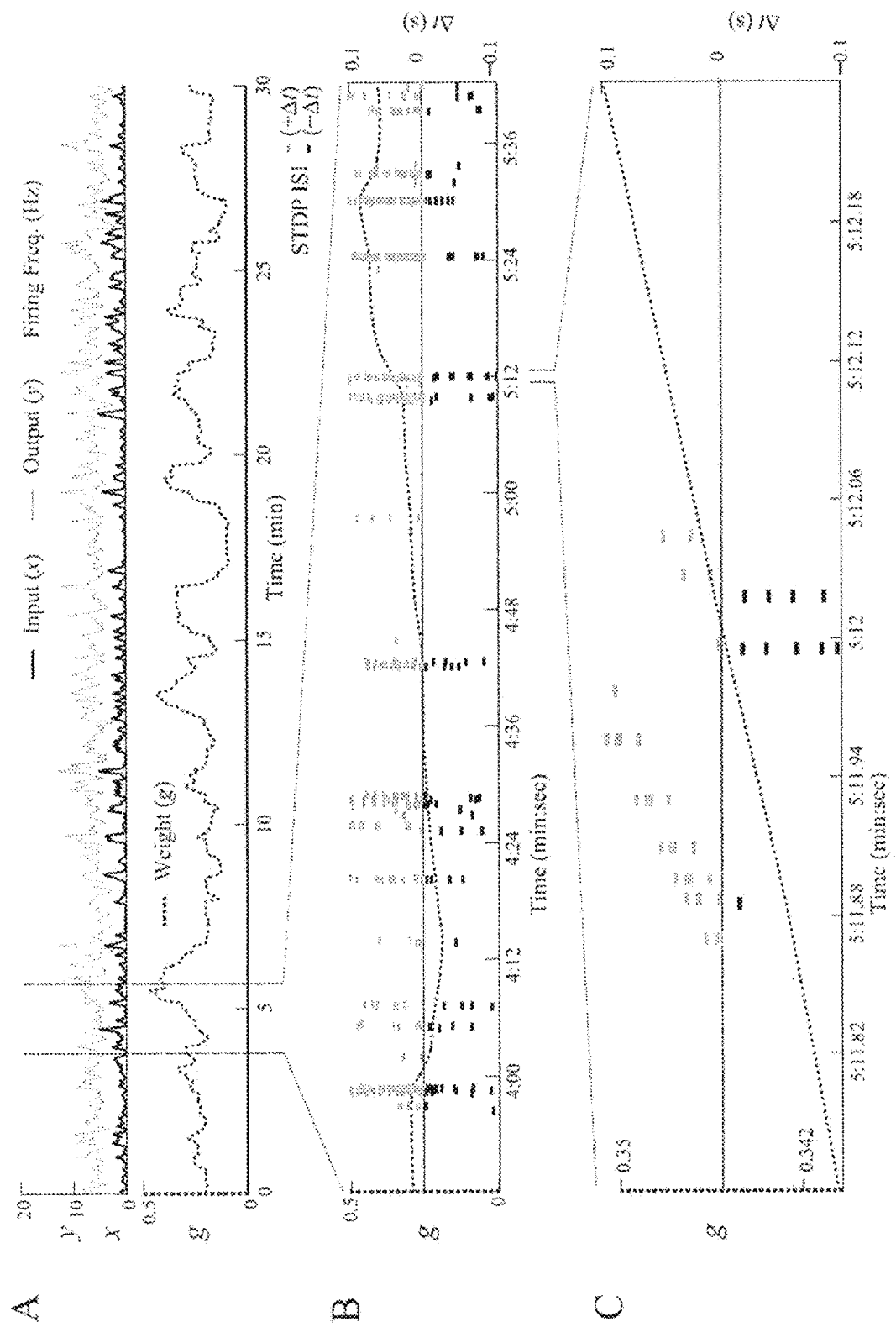
FIG. 6 illustrates a simulation of the spiking neuron model of FIG. 4 using three different timescales according to an embodiment of the present disclosure.

FIG. 6 illustrates simulation of the spiking neuron and STDP model with multiple scales. A illustrates a 30 minute timescale. Model input, constructed from resampled CA3 recordings, has non-Poisson spiking activity. Simulated output spiking activity has a baseline level with fluctuations correlated to input spiking activity. The simulated synaptic weight demonstrates stable and continuous fluctuations around a central value. B illustrates a 2 minute timescale. Weight fluctuations are triggered by bursts of spike pairings. The spike pairing intervals used in calculating the STDP rule weight modifications are shown as bars. The timing of the second spike of each pairing is plotted along the horizontal axis (for all +Δt, the second spikes are all output y spikes, while for all −Δt, the second spikes are all input x spikes). The length of each pairing interval is plotted along the vertical axis according to the scale on the right. C illustrates a 500 ms timescale. Weight fluctuations are not immediately affected by concurrent spiking activity because of delayed plasticity induction. Each group of vertically stacked bars represents a group of spike pairings with the same second spike.

For each parameter permutation, 10 different simulations are performed with a set of unique resampled input trains and Gaussian noise sequences. The average output firing rate for the 10 default simulation parameter trials is 6.1 Hz versus a baseline firing rate of 3.8 Hz, which would occur with no input. Parameter permutations include simulations run with 5 Hz Poisson process inputs and simulation lengths of 17 min (1,000 s) and 200 min (12,000 s).

In the spiking neuron model, the feedforward function, k, has the shape of a typical excitatory postsynaptic potential (EPSP). The feedback function, h, has a shape which contains an immediate negative refractory peak followed by a delayed facilitatory component. Feedforward, k, and feedback, h, function shapes used in simulations can be seen in FIG. 4.

Gaussian noise with σ=0.375 is used, which corresponds to a baseline firing rate of 3.8 Hz. An alternative way to describe this Gaussian noise level is to quantify how many unobserved Poisson spiking inputs with firing rate λ and the same feedforward function would yield noise with the same standard deviation. A closed-form expression for this noise standard deviation from unobserved Poisson spiking is shown in Equation 9 below.

$$\sigma_z(t) = g\sqrt{\lambda\Delta(1-\lambda\Delta)N_z\sum_{\tau=1}^{M}k^2(\tau)} \qquad \text{Equation 9}$$

In Equation 9, Nz is the number of unobserved inputs and Δ is the time bin interval of 1 ms. Gaussian noise with σ=0.375 in this case has the same standard deviation as Nz=1137 unobserved inputs with g=0.1 and the same firing rate of λ=0.76 Hz. Gaussian noise levels with σ=0.35 and σ=0.4 are also tested, which correspond to baseline firing rates of 2.1 Hz and 6.2 Hz, respectively.

For simplicity, the majority of simulations are run with one input; however, five input trials are used for multiple input validation. When increasing the number of inputs from one to five, the 10-trial average output firing rate increases from 6.1 Hz to 8.4 Hz; however, the weight fluctuation levels remained similar with averages of 0.19 with five inputs and 0.22 with one input (see FIG. 7).

Figure 7:
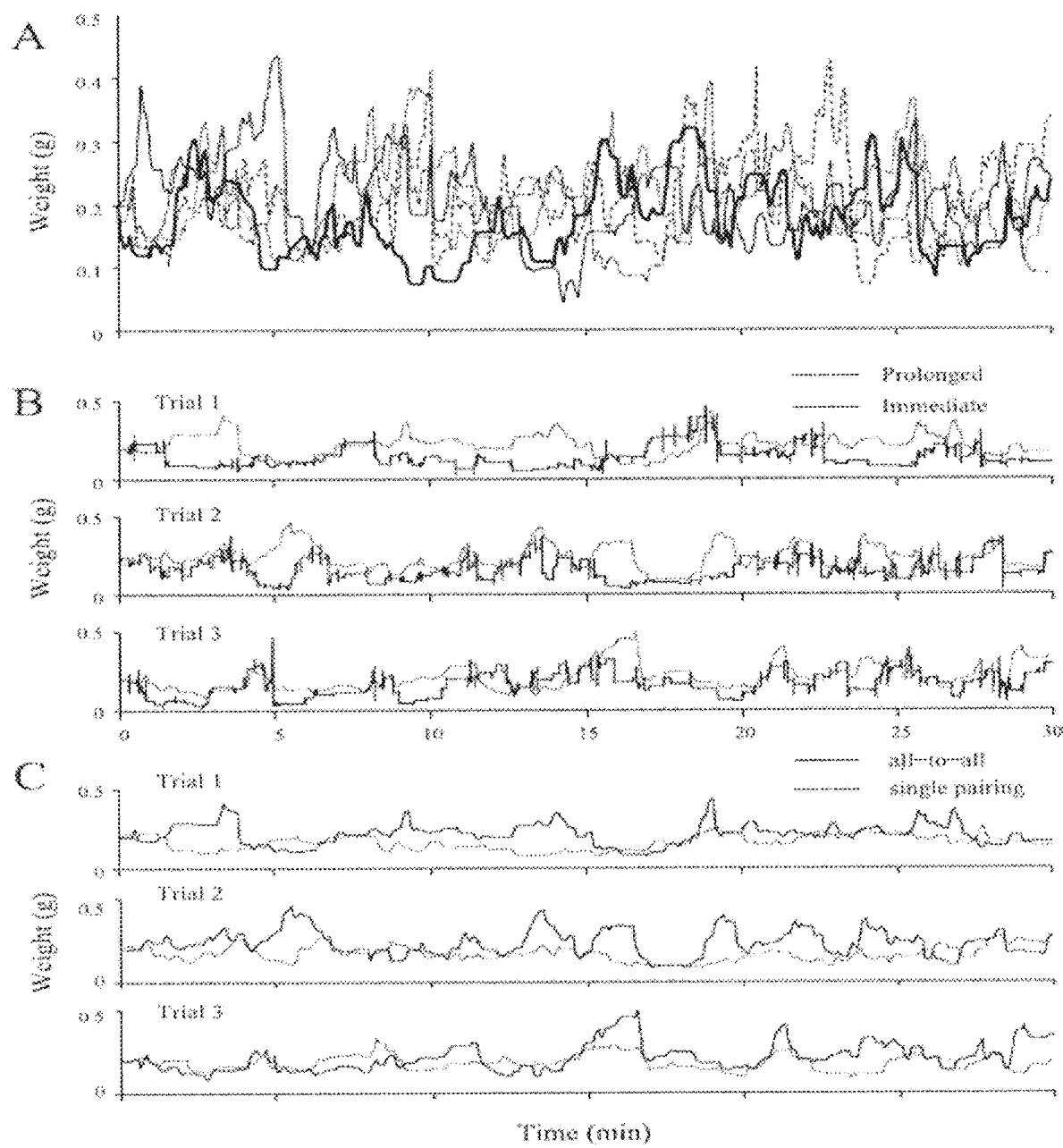
FIG. 7 illustrates a simulation of the spiking neuron model of FIG. 4 using three different parameter variations according to an embodiment of the present disclosure.

FIG. 7 illustrates a simulation of the spiking neuron and STDP model with parameter variation. A illustrates multiple inputs. Each line shows the weight value for an input from a simulation with five inputs. There are stable weight fluctuations in each input around an effective baseline weight. B illustrates prolonged versus immediate plasticity induction. With immediate induction, weight fluctuations have substantially different features, including timing of relative maximum and minimum values. C illustrates a spike pairing scheme. When using a single-pairing instead of an all-to-all spike pairing scheme, there are lower weight fluctuations with differing features.

In the STDP model, the amplitude functions, $A_{xy}$ and $A_{yx}$, have shapes based on experimental results. Identical STDP induction functions, $I_{xy}$ and $I_{yx}$, are used, which have a prolonged onset over a period of tens of seconds to match the relative timescale of the induction of long-term potentiation. Prolonged STDP induction causes substantially different weight fluctuations when compared to immediate STDP induction (see FIG. 7). STDP amplitude and induction function shapes used in simulations can be seen in FIG. 4. The spike pairing scheme for the STDP rule also affects the weight fluctuations during a simulation. In Equation 6, for each output spike, all preceding inputs spikes within an interval of $M_A$ are considered. Similarly, in Equation 7, for each input spike, all preceding output spikes within $M_A$ are considered. An alternate to this all-to-all scheme is a single-pairing scheme, where only the immediately preceding spikes are considered for each output and input spike (see FIG. 8). When the spike pairing scheme was changed from all-to-all to single-pairing (with identical input spiking and noise), there were significant differences in weight fluctuation features (see FIG. 7).

Figure 8:
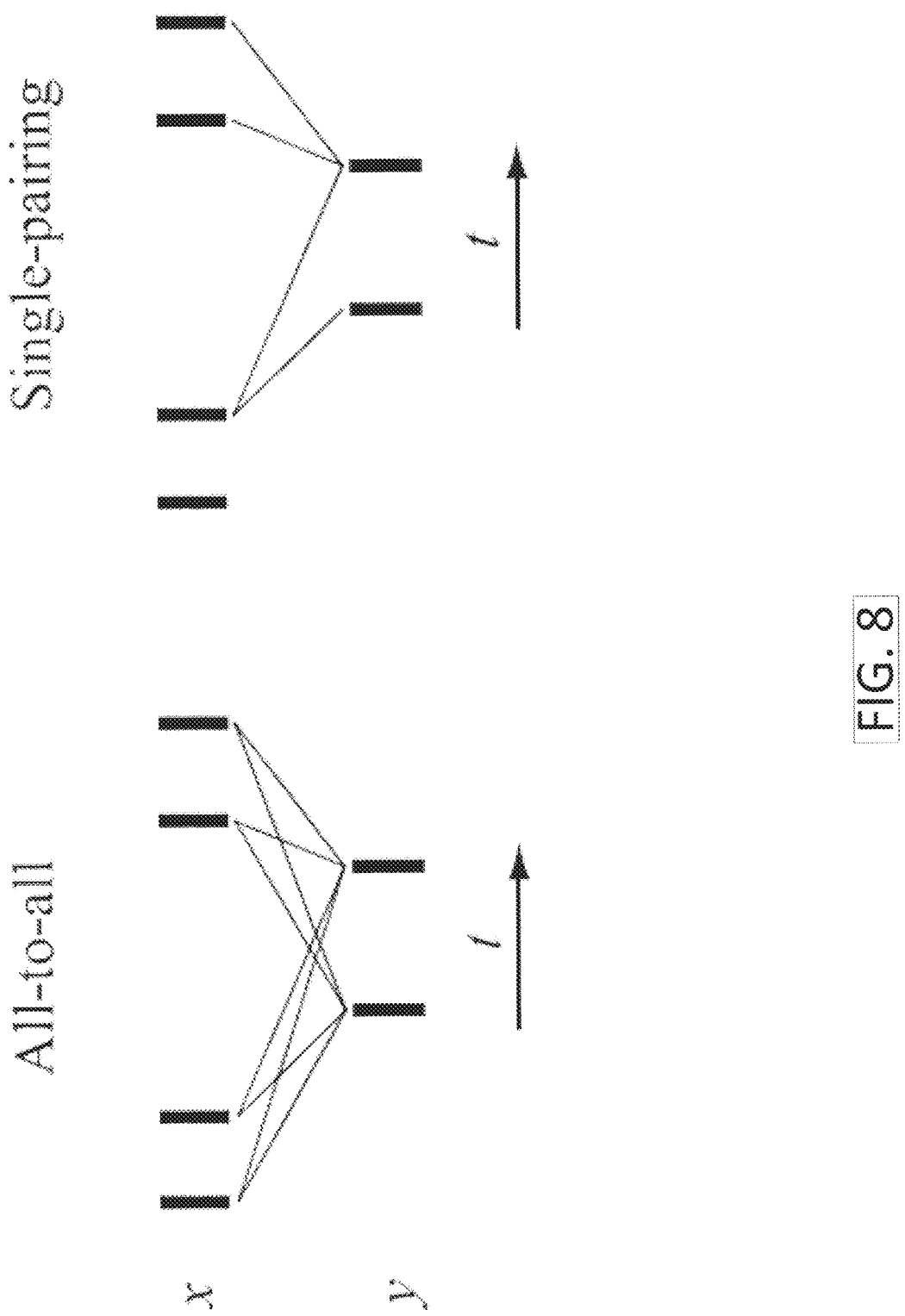
FIG. 8 illustrates a comparison of all-to-all spike pairing and single-pairing spike pairing according to an embodiment of the present disclosure.

FIG. 8 illustrates spike pairing scheme comparison. All-to-all: For each input (or output) spike, the interspike intervals from all preceding output (input) spike times are used in the calculations for change in synaptic weight. Single-pairing scheme: For each input (or output) spike, only the interspike intervals for the immediately preceding output (input) spikes are used in plasticity calculations.

Synaptic weight fluctuations are determined by the relative magnitudes of $\Delta g_{xy}$ and $\Delta g_{yx}$; therefore, a weight fluctuation level can be targeted by adjusting the relative magnitude of amplitude functions $A_{yx}$ versus $A_{xy}$. A relative depression factor, F, can be defined so that $A_{yx}$ can be modified from a standard $\overline{A}_{yx}$ function, as shown in Equation 10 below.

$$A_{yx} = F\overline{A}_{yx} \qquad \text{Equation 10:}$$

Equation 10 may be used to target different synaptic weight fluctuation levels, $\overline{g}$, in different simulations. A standard value of $\overline{g}=0.2$ is used; however, simulations are also performed with $\overline{g}=0.1$ and $\overline{g}=0.4$. Target values of $\overline{g}=0.1$, 0.2, and 0.4 are achieved by setting F equal to 11.5, 8.25, and 5.63, respectively. The initial weight of a simulation, $g_0$, is set to $g_0=\overline{g}$. In multiple studies, reported STDP curves depict the percentage of weight change after tens of spike pairings and typically show 100% increases in weight for spike pairings of $\Delta t=0-20$ ms. Here, the magnitude of weight change in $A_{xy}$ is specified additively and corresponds to a 100% increase in weight for 30 pairings of $\Delta t=15$ ms with $g_0=0.4$. The magnitude of $A_{yx}$ is adjusted to reach stable weight fluctuations as described above.

The goal of model estimation is to identify all neuron and plasticity model parameters ($\hat{\sigma}$, $\hat{k}$, $\hat{h}$, $\hat{A}_{xy}$, $\hat{A}_{yx}$, $\hat{I}_{xy}$, and $\hat{I}_{yx}$) from input and output spiking activity, x and y, that maximize the likelihood of observing output spiking activity, y. The present disclosure applies the following model estimation techniques to simulated spiking data as described above.

To minimize the number of parameters to be estimated, the present disclosure approximates each function as a weighted summation of a set of basis functions. For example, the feedforward function, k, can be represented as shown below in Equation 11.

$$k(\tau) = \sum_{j_k=1}^{L_k} c_k^{(j_k)} b_k^{(j_k)}(\tau). \qquad \text{Equation 11}$$

In Equation 11, $b_k^{(j_k)}$ is a basis function of order $j_k$ and $c_k^{(j_k)}$ is the corresponding coefficient. The term $L_k$ denotes the number of basis functions.

The functions can be represented in vector multiplication form as shown in Equation 12 below:

$$k(\tau) = b_k(\tau)^T c_k \qquad \text{Equation 12:}$$

In Equation 12, $b_k(\tau)$ and $c_k$ have length $L_k$.

All other model functions (h, $A_{xy}$, $A_{yx}$, $I_{xy}$, and $I_{yx}$) are decomposed similarly with their own corresponding sets of basis functions ($b_h$, $b_{A_{xy}}$, $b_{A_{yx}}$, $b_{I_{xy}}$, $b_{I_{yx}}$), which allows the model to be fully recreated by estimating $\hat{\sigma}$, $\hat{c}_k$, $\hat{c}_h$, $\hat{c}_{A_{xy}}$, $\hat{c}_{A_{yx}}$, $\hat{c}_{I_{xy}}$, and $\hat{c}_{I_{yx}}$. Laguerre basis functions are used for feedforward, feedback, and STDP induction functions ($b_k$, $b_h$, $b_{I_{xy}}$, and $b_{I_{yx}}$), taking advantage of their exponentially decaying shapes. For STDP amplitude functions, the more local B-spline basis functions are used to avoid overconstraining the asymptomatic shapes of the unknown functions.

Parameter estimation is facilitated by formulating the neuron model of firing probability from Equation 5 in the form of a generalized multilinear model (GMLM). Sets of parameter estimates can therefore be updated by expressing firing probability as a GLM with a probit link function as shown below in Equation 13.

$$P_f(t) = \Phi(\eta(t)) \qquad \text{Equation 13:}$$

In Equation 13, $\eta(t)$ is a linear predictor in which the parameters to be estimated are linearly separated. Standard GLM algorithms using maximum likelihood estimation (MLE) with iterative reweighted least-squares (IRWLS) can be used for updating sets of parameter estimates with well-defined convergence properties. Unconstrained optimization is used to estimate $\hat{A}_{yx}$ and $\hat{I}_{yx}$ due to nonlinearity caused by multiplicative weight dependence. Finally, an initialization and iteration structure is used to estimate all model functions together.

The firing probability model in Equation 5 can be used as the basis of GLM estimation by formulating u and a with basis function expansion. The postsynaptic membrane potential, u, can be decomposed from Equation 3 as shown in Equation 14 below.

$$u(t) = \sum_{j_k=1}^{L_k} c_k^{(j_k)} v_k^{(j_k)}(t) g(t) = v_k(t)^T c_k g(t) \qquad \text{Equation 14}$$

In Equation 14, $v_k(t)$ is a vector of length $L_k$ that represents input spiking activity filtered through the feedforward basis functions with elements $v_k^{(j_k)}(t)$, where $v_k^{(j_k)}(t)$ is shown in Equation 15 below.

$$v_k^{(j_k)}(t) = \sum_{\tau=1}^{M_k} b_k^{(j_k)}(\tau) x(t-\tau) \qquad \text{Equation 15}$$

Note that in Equation 14, only one input is shown for simplicity. Similarly, $a(t) = v_h(t)^T c_h$.

The weight changes, $\Delta g_{xy}(t)$ and $\Delta g_{yx}(t)$, can be expanded in a similar manner, as shown below in Equations 16-19.

$$\Delta g_{xy}(t) = \sum_{j_A=1}^{L_A} \sum_{j_I=1}^{L_I} c_{A_{xy}}^{(j_A)} c_{I_{xy}}^{(j_I)} v_{xy}^{(j_A,j_I)}(t) = c_{A_{xy}}^T V_{xy}(t) c_{I_{xy}} \qquad \text{Equation 16}$$

$$\Delta g_{yx}(t) = c_{A_{yx}}^T V_{yx}(t) c_{I_{yx}} \qquad \text{Equation 17}$$

$$v_{xy}^{(j_A,j_I)}(t) = \sum_{\tau_x=1}^{M_I} \sum_{\tau_y=0}^{\tau_x-1} b_{A_{xy}}^{(j_A)}(\tau_x - \tau_y) b_{I_{xy}}^{(j_I)}(\tau_y) x(t-\tau_x) y(t-\tau_y) \qquad \text{Equation 18}$$

$$v_{yx}^{(j_A,j_I)}(t) = \sum_{\tau_y=1}^{M_I} \sum_{\tau_x=0}^{\tau_y-1} b_{A_{xy}}^{(j_A)}(\tau_y - \tau_x) b_{I_{xy}}^{(j_I)}(\tau_y) x(t-\tau_x) y(t-\tau_y) \qquad \text{Equation 19}$$

In Equations 16-19, $V_{xy}(t)$ and $V_{yx}(t)$ are $L_A \times L_I$ matrices with elements $v_{xy}^{(j_A,j_I)}(t)$ and $v_{yx}^{(j_A,j_I)}(t)$, respectively. The multiplication of $\Delta g_{yx}(t)$ by the previous weight in Equation 8 does not allow $\Delta g_{yx}(t)$ to be linearly separated in $\eta(t)$, which means that $\hat{c}_{A_{yx}}$ and $\hat{c}_{I_{yx}}$ may not be estimated with GLM techniques. However, all other parameters can be estimated as a GLM by embedding $\Delta g_{yx}(t)$ into the firing probability model using Equations 20-22 below.

$$g(t) = D_0(t) g_0 c_{A_{xy}}^T D_{xy}(t) c_{I_{xy}}, \quad g_0 = g(1) \qquad \text{Equation 20:}$$

$$D_{xy}^{(j_A,j_I)}(t) = v_{xy}^{(j_A,j_I)}(t-1)[1+\Delta g_{yx}(t)] + v_{xy}^{(j_A,j_I)}(t) \qquad \text{Equation 21:}$$

$$D_0(t) = D_0(t-1)[1+\Delta g_{yx}(t)], D_0(1) = 1 \qquad \text{Equation 22:}$$

In Equations 20-22, $D_{xy}(t)$ is an $L_A \times L_I$ matrix with elements $D_{xy}^{(j_A,j_I)}(t)$. The difference between $D_{xy}(t)$ and $V_{xy}(t)$ from above is that $D_{xy}(t)$ has $\Delta g_{yx}(t)$ embedded and is dependent on $v_{xy}^{(j_A,j_I)}$ from the previous time step. A full characterization of the firing probability with basis function expansion and linearly separated coefficients can be defined by combining Equations 5, 14, and 20 as shown below in Equation 23.

$$P_f(t) = \Phi\left(\frac{-1 + v_k(t)^T c_k [D_0(t)g_0 + c_{A_{xy}}^T D_{xy}(t) c_{I_{xy}}] + v_h(t)^T c_h}{\sigma}\right) \quad \text{Equation 23}$$

For each model function estimate, appropriate sets of basis functions, ($b_k$, $b_h$, $b_{A_{xy}}$, $b_{A_{yx}}$, $b_{I_{xy}}$, and $b_{I_{yx}}$), must be used. For both Laguerre and B-spline sets of basis functions, the number of basis functions, L, must be chosen. In addition, for B-spline basis functions, their distribution in time must be chosen, as well as their degree. For $b_{xy}$ and $b_{yx}$, four third-degree B-splines are used. Knots are distributed unevenly with higher density in smaller $\Delta t$ values. A time window of 200 ms is chosen to distribute $b_{A_{xy}}$ and $b_{A_{yx}}$ because of the short relevant timescale for STDP spike pairings. For Laguerre basis functions, the Laguerre parameter a, which controls the rate of basis function decay, is chosen based on the durations of modeled processes. For $b_k$ and $b_h$, a values were chosen to span the expected durations of 200 ms; for $b_{I_{xy}}$ and $b_{I_{yx}}$, a values were chosen to span the expected durations of 30 s. As L increases, a becomes less important to control. The number of basis functions used for k, h, $I_{xy}$, and $I_{yx}$ are $L_k = 4$, $L_h = 4$, $L_{I_{xy}} = 3$, and $L_{I_{yx}} = 3$, respectively. Laguerre basis functions have also been used to estimate STDP amplitude functions accurately (results not shown); however, B-splines are used here because they are local and not biased toward fitting function shapes with exponential decay.

There are four steps employed to enable model estimation from the $P_f$ model in Equation 23.

1. Estimation of a subset of all $\tilde{c}$ parameters from a multilinear GLM form where $\tilde{c}_{GLM} = \{\tilde{c}_0, \tilde{c}_k, \tilde{c}_h, \tilde{g}_0, \tilde{c}_{A_{xy}}, \tilde{c}_{I_{xy}}\}$.
2. Unconstrained optimization of non-GLM parameters $\tilde{c}_{A_{yx}}$ and $\tilde{c}_{I_{yx}}$.
3. Creation of an initialization and iteration structure to estimate all $\tilde{c}$ parameters
4. Normalization of all initial estimates $\tilde{c}$ into $\hat{c}$.

First, the predictor $\eta(t)$ from Equation 13 can be expressed as shown below in Equation 24.

$$\eta(t) = \tilde{c}_0 + v_k(t)^T \tilde{c}_k [\tilde{D}_0(t)\tilde{g}_0 + \tilde{c}_{A_{xy}}^T \tilde{D}_{xy}(t) \tilde{c}_{I_{xy}}] + v_h(t)^T \tilde{c}_h \quad \text{Equation 24:}$$

In Equation 24, $\tilde{D}_0(t)$ and $\tilde{D}_{xy}(t)$ rely on $\tilde{c}_{A_{yx}}$, $\tilde{c}_{I_{yx}}$ as shown in Equations 25 and 26 below.

$$\tilde{D}_{xy}^{(j_A,j_I)}(t) = v_{xy}^{(j_A,j_I)}(t-1)[1 + \tilde{c}_{A_{yx}}^T V_{yx}(t) \tilde{c}_{I_{yx}}] + v_{xy}^{(j_A,j_I)}(t) \quad \text{Equation 25:}$$

$$\tilde{D}_0(t) = D_0(t-1)[1 + \tilde{c}_{A_{yx}}^T V_{yx}(t) \tilde{c}_{I_{yx}}] \quad \text{Equation 26:}$$

The predictor $\eta(t)$ in Equation 24 can be considered trilinear or multilinear with respect to $\tilde{c}_{GLM} = \{\tilde{c}_0|, \tilde{c}_k, \tilde{c}_h, \tilde{g}_0, \tilde{c}_{A_{xy}}, \tilde{c}_{I_{xy}}\}$, because these coefficients can be linearly isolated into three sets, $\{\tilde{c}_0|, \tilde{c}_k, \tilde{c}_h\}$, $\{\tilde{c}_0, \tilde{g}_0, \tilde{c}_{A_{xy}}\}$, and $\{\tilde{c}_0, \tilde{g}_0, \tilde{c}_{I_{xy}}\}$, which are unique in feedforward, amplitude, and induction coefficients, respectively. The maximum likelihood estimate for each of these sets is unique using the standard GLM technique of IRWLS while holding all remaining model parameters fixed.

Unconstrained optimization can be used to estimate non-GLM parameters $\tilde{c}_{A_{yx}}$ and $\tilde{c}_{I_{yx}}$ given a cost function. The deviance of GLM estimation is an indicator of how well the model fits, and can be used as a cost function to simultaneously estimate a subset of GLM parameters with non-GLM parameters. Specifically, $\tilde{c}_{A_{yx}}$ can be optimized with a cost function using the deviance of the GLM fit of $\{\tilde{c}_0, \tilde{g}_0, \tilde{c}_{A_{xy}}\}$ while holding all parameters fixed except for $\tilde{c}_{A_{yx}}$. Likewise, $\tilde{c}_{I_{yx}}$ can be simultaneously estimated with $\{\tilde{c}_0, \tilde{g}_0, \tilde{c}_{I_{xy}}\}$. While several different algorithms could be used for unconstrained optimization, a Nelder-Mead simplex algorithm was used, as defined in Matlab.

Each GLM, IRWLS step and each non-GLM unconstrained optimization step estimates a subset of parameters with respect to the remaining model parameters. In order to achieve convergence to satisfactory estimates for all of the model parameters, a naive but structured initialization and iteration scheme is used for estimation. This scheme is shown below.

1. Initialize $\{\tilde{c}_{A_{UY}}, \tilde{c}_{A_{UY}}\} = 0, \{\tilde{c}_{I_{UY}}, \tilde{c}_{I_{UY}}\} = [1 \ 0 \ \ldots \ 0]^T$
2. Repeat the following steps to update estimates of $\tilde{c} = \{\tilde{c}_0, \tilde{c}_k, \tilde{c}_h, \tilde{g}_0, \tilde{c}_{A_{xy}}, \tilde{c}_{I_{xy}}, \tilde{c}_{A_{yx}}, \tilde{c}_{I_{yx}}\}$, until a change in the model likelihood of observing output spiking events is less than $\epsilon$.
3. Feedforward estimation of $\{\tilde{c}_0, \tilde{c}_k, \tilde{c}_h\}$ using GLM-IRWLS (holding remaining parameters fixed).
4. STDP amplitude estimation of $\tilde{c}_{A_{yx}}$ and $\{\tilde{c}_0, \tilde{g}_0, \tilde{c}_{A_{xy}}\}$. Perform unconstrained optimization of $\tilde{c}_{A_{yx}}$ (for the cost function use the deviance of GLM-IRWLS estimation of $\{\tilde{c}_0, \tilde{g}_0, \tilde{c}_{A_{xy}}\}$ given $\tilde{c}_{A_{yx}}$ while holding remaining parameters fixed).
5. STDP induction estimation of $\tilde{c}_{I_{yx}}$ and $\{\tilde{c}_0, \tilde{g}_0, \tilde{c}_{I_{xy}}\}$. Perform unconstrained optimization of $\tilde{c}_{I_{yx}}$ (for the cost function, use the deviance of GLM-IRWLS estimation of $\{\tilde{c}_0, \tilde{g}_0, \tilde{c}_{I_{xy}}\}$ given $\tilde{c}_{I_{yx}}$ while holding remaining parameters fixed).

Without the unconstrained optimization steps above, the iterative updating of each linear parameter set is equivalent to generalized tensor regression with rank 1.

Final estimates $\tilde{c} = \{\hat{\sigma}, \hat{c}_h, \hat{c}_k, \hat{g}_0, \hat{c}_{I_{yx}}, \hat{c}_{I_{yx}}, \hat{c}_{A_{yx}}, \hat{c}_{A_{yx}}\}$ can be recovered from $\tilde{c}$ by normalizing with regard to $\hat{\sigma} = -1/\tilde{c}_0$ and defining conventions to eliminate redundancy between estimates such that the maximum of $\hat{k}$ is unity and the sum of each induction function ($\hat{I}_{xy}$, $\hat{I}_{yx}$) is unity.

Estimation results will now be discussed. With the input-output spike data simulated above, the spiking neuron and STDP coefficients are further estimated using the method described above. Successful identification of the neuron and STDP model is achieved for all simulation parameters with enough simulated time. Due to the stochastic nature of the simulations, there is trial-to-trial variability in fit fidelity. Trends are identified by completing 10 trials for each parameter permutation. The normalized root-mean-square error (NRMSE) can be used as a metric to analyze the relative fit fidelity of each estimated modeled function. Calculation for the NRMSE for $\hat{k}$ in each trial is defined as shown in Equation 27 below:

$$e_k = \sqrt{\frac{\sum_{\tau=1}^{M_k}(k(\tau) - \hat{k}(\tau))^2}{\sum_{\tau=1}^{M_k} k(\tau)^2}} \quad \text{Equation 27}$$

The NRMSE is similarly calculated for all other model functions. The average $e_k$ across all 10 trials of the same parameter set is defined as $\bar{e}_k$, and again similarly for all other model functions.

Figure 9:
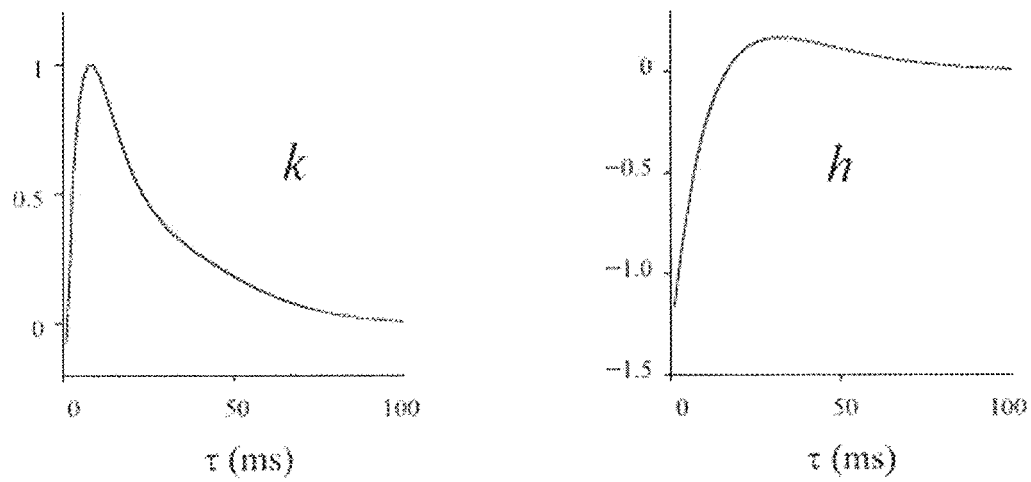
FIG. 9 illustrates a comparison of spiking data using a spiking neuron model alone and the spiking neuron model using spike-timing-dependent plasticity (STDP) of FIG. 4 according to an embodiment of the present disclosure.
Figure 9:
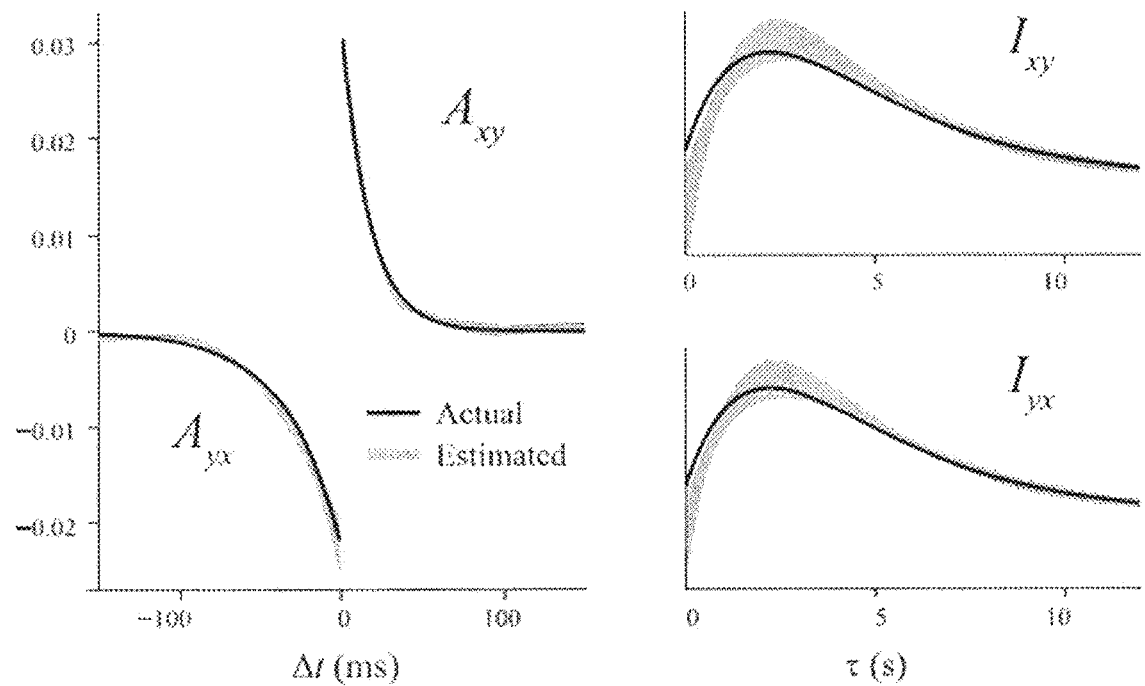
Figure 10:
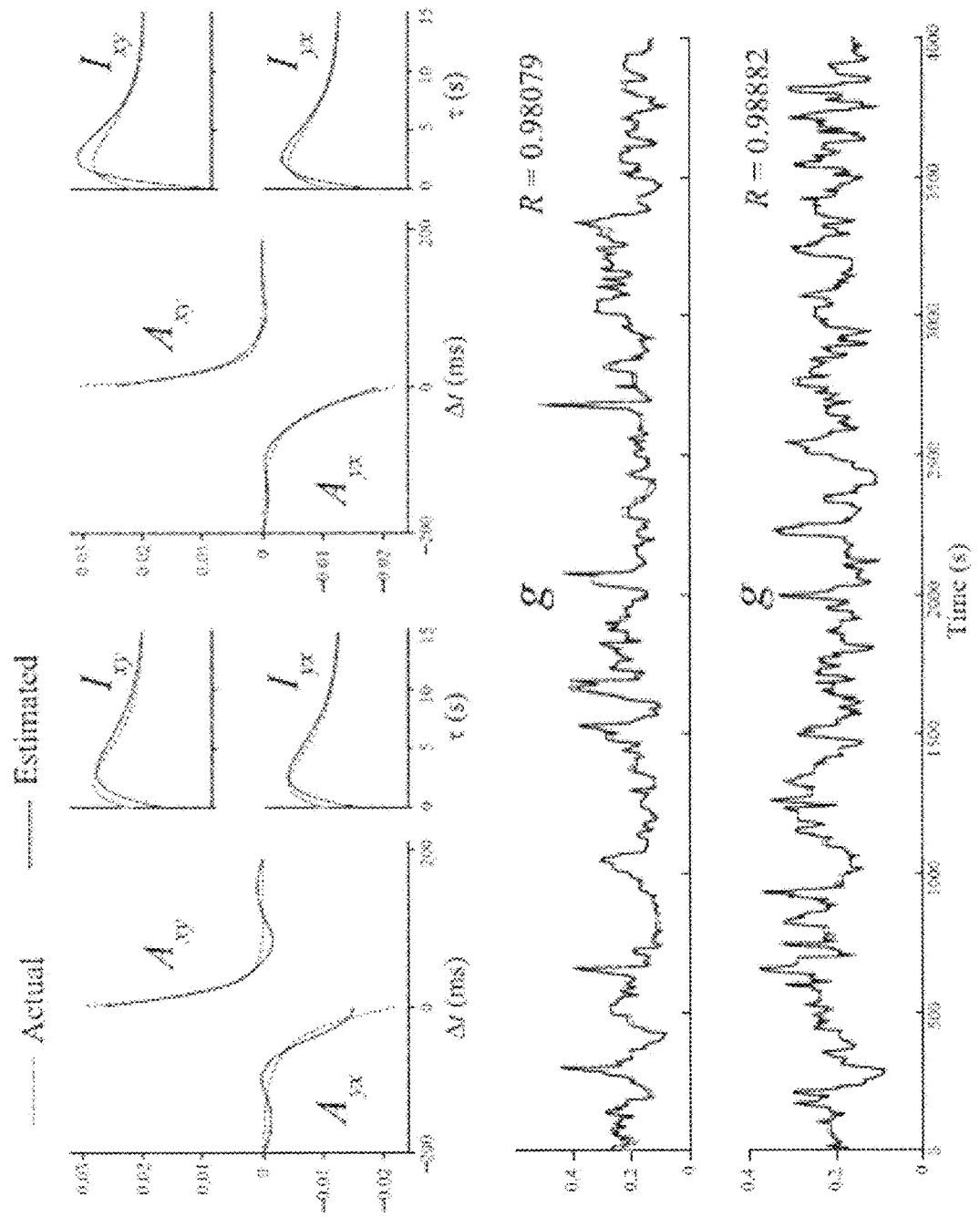
FIG. 10 shows graphs that illustrate individual trial estimated spike-timing-dependent plasticity (STDP) functions and weight fluctuations according to an embodiment of the present disclosure.
Figure 11:
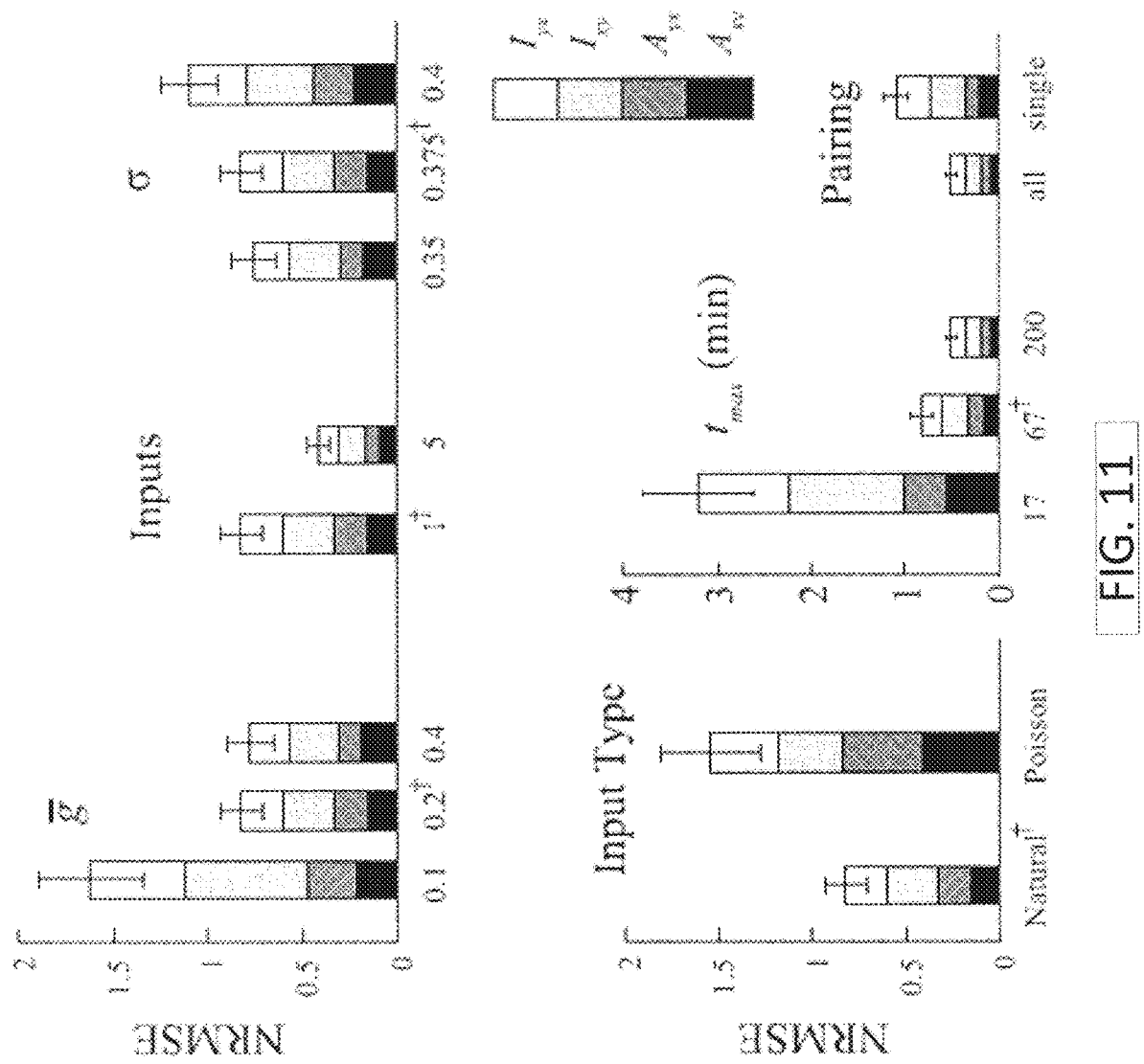
FIG. 11 shows graphs that illustrate a comparison of fit fidelity with varying simulation parameters according to an embodiment of the present disclosure.
Figure 13:
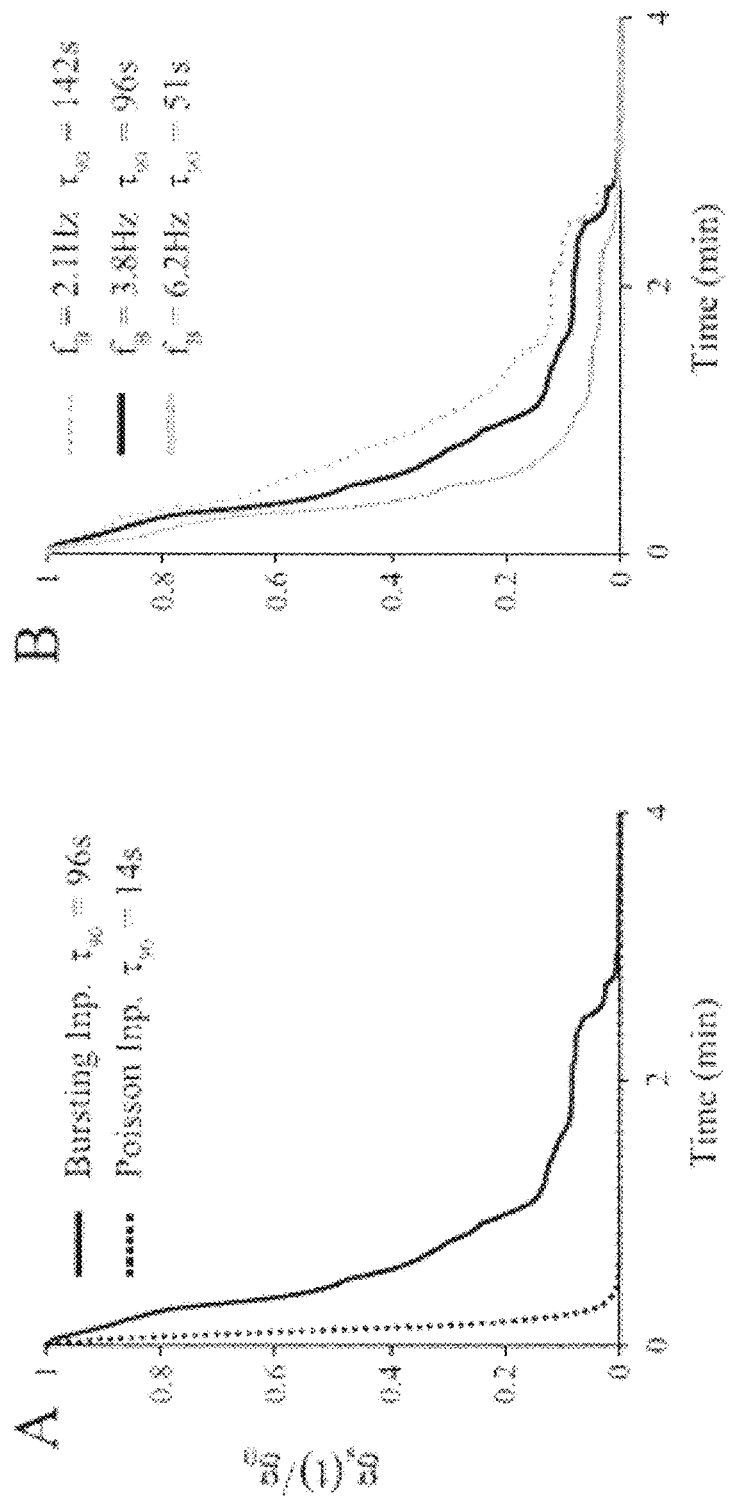
FIG. 13 shows graphs that illustrate a comparison of decay of initial weight contribution for several parameters according to an embodiment of the present disclosure.

The neuron model estimates, $\hat{k}$, $\hat{h}$, and $\hat{\sigma}$ are always accurate, regardless of what simulation parameters are used (the maximum $\bar{e}_k=0.12$, $\bar{e}_h=0.04$, and $\bar{e}_\sigma=0.07$ for all fits estimated). There is more variation in the STDP model estimates, $\hat{A}_{xy}$, $\hat{A}_{yx}$, $\hat{I}_{xy}$, and $\hat{I}_{yx}$, as can be seen in FIGS. 9 and 11. Fitting results to a standard set of simulation parameters, ($\bar{g}=0.2$, 1 input, $\sigma=0.375$, natural input spiking, and $t_{max}=67$ min), are robust ($\bar{e}_{A_{xy}}=0.16$, $\bar{e}_{A_{yx}}=0.18$, $\bar{e}_{I_{xy}}=0.27$, $\bar{e}_{I_{yx}}=0.22$, $\bar{e}_{g_0}=0.17$), and can be seen in FIG. 9. Errors in initial weight estimates, $\hat{g}_0$, are expected because the effective weight contribution of the initial weight diminishes quickly (to <10% with default parameters after 96 s, as seen in FIG. 13). In addition to robust model identification, the estimated weight fluctuations in each trial match simulated weights closely, as seen in FIG. 10. For simulated versus estimated g with the standard simulation parameters, the average Pearson's correlation coefficient, $\bar{R}_g$, is 0.991. To analyze the importance of assuming prolonged induction, estimation is performed on the same generated data while assuming only immediate induction in the identification model. The resulting estimates of $\hat{A}_{xy}$, $\hat{A}_{yx}$, and g are distorted from the simulated values but are still correlated and may still serve as useful approximations ($\bar{e}_{A_{xy}}=0.58$, $\bar{e}_{A_{yx}}=0.70$, $\bar{R}_g=0.841$, with immediate induction versus 0.16, 0.18, and 0.991, respectively, with prolonged induction).

FIG. 9 illustrates an estimated spiking neuron model and STDP model functions from spiking data. All plots show the 95% confidence bounds from 10 estimation trials compared to the target function values used in the generative simulations. Successful estimation of all model functions and parameters is demonstrated. A illustrates estimated spiking neuron model functions are the most accurate. B illustrates STDP amplitude functions that are recovered more accurately than STDP induction functions.

FIG. 10 illustrates individual trial estimated STDP functions and weight fluctuations. The 2 trials out of 10 with the lowest correlation values between estimated and simulated weight fluctuations are shown for the default simulation parameter set (the estimated STDP functions on the right correspond to the weight traces on the bottom).

FIG. 11 illustrates a comparison of fit fidelity with varying simulation parameters. Default simulation parameters are indicated with a † and correspond to simulation results plotted in FIGS. 9 and 10. Stacked bar values depict $\bar{e}_{A_{xy}}$, $\bar{e}_{A_{yx}}$, $\bar{e}_{I_{xy}}$, and $\bar{e}_{I_{yx}}$ (error bars correspond to the summation of the SEM).

Estimation is also conducted with simulation parameter permutations to explore the robustness of model identification. Increasing the effective weight baseline, $\bar{g}$, the number of inputs, and simulation length, $t_{max}$, increases fit fidelity, as seen in FIG. 11. Model identification is consistently achieved at 67 and 200 min, but not at 17 min. The all-to-all spike pairing scheme has better estimation properties than the single-pairing scheme (see FIG. 11), likely due to the increased number of interspike intervals evaluated in the estimation process. The single-pairing scheme, however, achieves successful estimation when the simulation duration is increased to 200 min. When comparing the effect of modeled noise standard deviation, $\sigma$, lower $\sigma$ values (which cause lower baseline firing rates) cause an increase in fit fidelity (see FIG. 11). This signifies that even with sparsely firing output neurons (with fewer spike pairings and fewer associated weight changes), STDP identification can still be achieved. This is likely due to the increased ratio of output spikes caused by input firing versus noise. The resampled CA3, physiological, input spike trains used have more clustering of spikes than uncorrelated Poisson spike trains.

In a comparison between 0.76 Hz physiological input (labeled Natural) and 5 Hz Poisson input (see FIG. 11), STDP model identification is superior with the physiological input despite the lower firing rate. This result signifies that the STDP identification approach is suited well for physiological, sparse input spiking data.

Figure 12:
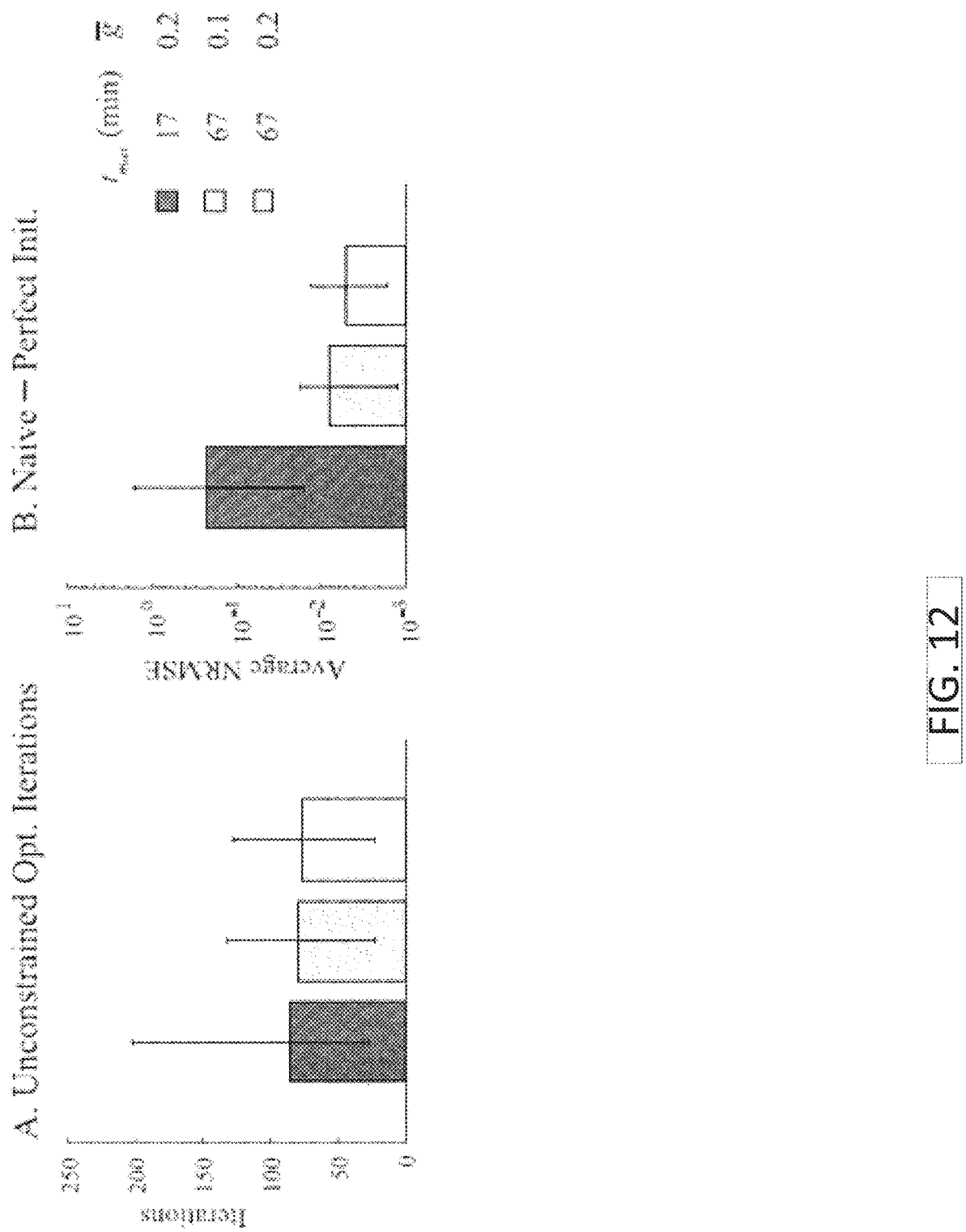
FIG. 12 shows graphs that illustrate convergence of an estimation algorithm according to an embodiment of the present disclosure.

FIG. 12 illustrates convergence of the estimation algorithm. A illustrates each unconstrained optimization step identified as a stationary solution in 203 or fewer total iterations. B illustrates average NRMSE between estimated STDP functions when initialized naively versus perfectly to the underlying model. All error bars denote maximum and minimum values across trials (default values used for unlabeled parameters).

Discussion will now turn to an analysis of the estimation algorithm. The estimation algorithm contains GLM-IRWLS steps, unconstrained optimization steps, and an initialization/iteration structure that links all of the steps together. Due to the properties of the GLM with a probit link function, each of the GLM-IRWLS steps is a concave estimation problem that, if it converges, yields a unique maximum likelihood estimate for the parameter subset being estimated. When combining iterative GLM steps into generalized multilinear model estimation, there is global convergence of estimates to stationary points and local convergence, where estimates are attracted toward local maxima. With the addition of unconstrained optimization in the complete estimation procedure, there are no longer theoretical guarantees for estimation solutions.

Convergence, however, is still observed in practice with the implemented naive initialization procedure to stationary estimates around the true underlying model given a large enough data duration. For each unconstrained optimization step, stationary solutions are achieved in 203 or fewer iterations of the implemented Nelder-Simplex algorithm (see FIG. 12). Estimates for the entire set of parameters reach stationary points within two repetitions of steps 3 to 5 described above. With 67 minutes of data, all estimated STDP functions are equivalent when initialized naively versus perfectly to the underlying model with an average NRMSE<0.02 for all trials (see FIG. 12). When tested with arbitrarily large initialization points, solutions do not necessarily converge, and estimates frequently do not match those with perfect initialization. Therefore, the initialization scheme implemented is both effective and necessary in enabling estimation.

An alternative expression for $\eta(t)$ in Equation 24 is one that is full rank instead of multilinear. The Volterra representation is also full rank as opposed to multilinear (Marmarelis, 2004). A full-rank expression has a separate coefficient for every combination of multilinear coefficients, which makes $\eta(t)$ linear with respect to the GLM parameters. An advantage of full rank over multilinear expression is that estimation does not have to be iterative and would yield a global optima. The full-rank model is also capable of describing more complex interactions. However, the number of coefficients that must be estimated in the full-rank model is substantially more—$(1+L_h+2\times n\times L_k\times L_A\times L_I)$ as opposed to $(1+L_h+n\times L_k+2\times[L_A+L_I])$ in the multilinear model. The multilinear model is also more interpretable because the k, $A_{xy}$, and $I_{xy}$ functions are estimated separately, while a full-rank model would be described by a three-dimensional function that would be hard to visualize. Furthermore, for the non-GLM parameters, full-rank estimation would necessitate unconstrained optimization for $(L_A\times L_I)$ parameters, which could become intractable as opposed to separate steps of estimating $L_A$ and $L_I$ parameters in the multilinear model.

This disclosure formulates a flexible spiking neuron model structure with STDP, which includes functions that characterize the stationary (k, h, σ) and plastic ($A_{xy}$, $A_{yx}$, $I_{xy}$, $I_{yx}$) properties of the neuron. By incorporating functions for prolonged induction of STDP ($I_{xy}$, $I_{yx}$), the disclosure accounts for the fact that STDP evolves with time instead of being instantaneous. Next, the disclosure formulizes an estimation technique using the generalized multilinear model (GMLM) structure and introduces an iterative approach to address nonlinear dependence of the model parameters on synaptic weight. Finally, the disclosure demonstrates successful model estimation on simulated spiking data and shows that all model parameters can be estimated accurately with this method. There is relatively higher variability, however, in the plasticity model parameter estimates ($g_0$, $A_{xy}$, $A_{yx}$, $I_{xy}$, $I_{yx}$) than in the spiking neuron model parameter estimates (k, h, σ). Several factors can enhance the fitting performance: (1) higher weight fluctuation levels, (2) longer simulation time, (3) lower background firing rate, (4) larger number of inputs, (5) using physiological instead of Poisson spike trains, and (6) using an all-to-all instead of single-pairing spike pairing scheme. Any simulation parameter that shows decreased fitting accuracy can be compensated for by increasing simulation time. While most simulation parameters yield excellent fits with approximately 1 hour of simulated data, some fits require as short as tens of minutes or as long as 200 minutes of simulated data. Performance indicates that this identification method is robust to conditions with bursting inputs and varied baseline firing rates.

The presented identification methodology relies on a generalized multilinear model (GMLM) formulation for parameter estimation, where output firing probability is expressed with a multilinear predictor function coupled to a probit link function. The main advantages of using a multilinear model as opposed to a full-rank model (i.e., a Volterra model) are a reduction in the number of parameters to estimate and improving the interpretability of results. For example, the five-input trilinear model used here has 39 open parameters, while a full-rank representation would have 485 open parameters. These advantages have motivated related approaches including neuron model estimation as a multilinear model without a link function, and as a generalized bilinear model (GBLM). The current trilinear model can be extended to include higher-order multilinearities with only a moderate increase in parameters to make the model more general. For example, the pair-wise STDP rule here could be enhanced to consider triplets with an extra multilinear model dimension.

The addition of subsets of non-GLM parameters estimated with unconstrained optimization here differentiates this model structure and its convergence properties from the GBLM and models equivalent to a GMLM. Given sufficient data duration, however, solutions with the implemented naive initialization and iteration structure are equivalent to those perfectly initialized to the true underlying model. Successful incorporation of nonlinear parameters in the model signifies that the model could likely be extended to include additional nonlinear features.

The methodology disclosed herein is an extension of previous nonlinear neuron ensemble modeling to include plasticity, and shares previous advantages of the interpretability of spiking neuron model parameter, basis function expansion, and GLM expression. The neuron model has separate feedforward, feedback, and noise parameters, which can be interpreted as functional connectivity (postsynaptic potential), after-potential, and baseline firing rate, respectively. For simplicity, the disclosure includes only the first-order feedforward Volterra kernel, k. However, second order Volterra kernels can be added to characterize paired-pulse facilitation or depression (short-term synaptic plasticity) and nonlinear interactions between more than one input. The formulation of the firing probability of the neuron model as a GLM with basis function expansion allows using standard techniques to estimate the neuron model with a low number of open parameters. Overfitting, which is not specifically addressed here due to the relatively low numbers of parameters estimated, could be minimized with regularized or penalized estimations. In previous plasticity identification work, a two-stage estimation procedure was used that first tracks synaptic weight trajectory with adaptive filtering and then estimates the plasticity rule using spiking activity and the tracked weight fluctuations. The approach presented in this disclosure makes an important improvement in estimating the synaptic plasticity rules in a single stage and thus effectively mitigates the loss of information between stages of estimation.

Additional assumptions in the plasticity model about weight dependence directly affect STDP estimation, stability, and functionality. The inclusion of weight dependence adds an extra source of nonlinearity, which complicates model estimation and necessitates the use of unconstrained optimization. A related study uses a GBLM for STDP identification; however, prolonged induction, and the central challenges of weight dependence and stability were not addressed. Here, the implemented multiplicative, weight dependent rule enables system stability and in simulations caused weight to continuously fluctuate around an effective baseline value, $\bar{g}$. A model for plasticity involved in learning, however, implicates the ability to form persistent changes in weight, which were not seen in simulations with these continuous weight fluctuations. To better understand the persistence of weight changes caused by the plasticity rule in the present disclosure, analysis has been performed and showed that weight changes in simulations were indeed short-lived at less than 3 minutes. Since the inputs into the model were unpatterned, however, it is reasonable to expect that they would not cause persistent weight changes. Longer-lasting weight changes may be seen with correlated input or periods of lower output spiking activity. Additionally, persistence in weight changes is enhanced with a similar weight-dependent STDP rule when lateral inhibition is considered. To further enable persistent change, more features could be included and estimated in the plasticity rule, such as synaptic tagging and capture, dopamine release based on novel stimulus timing, calcium levels, and reliance on synaptic membrane potential.

Overall, the present disclosure presents a methodology for estimating a STDP rule from observed spiking activity, a departure from characterizing STDP by measuring postsynaptic potentials before and after applying a spike-pairing protocol. First, this allows STDP characterization to be applied to a broader set of studies that can be in vivo, mammalian, hippocampal, and during a wide array of cognitive tasks. When applied to cognitive tasks, the estimated STDP rule would be especially insightful because it would be descriptive of plasticity exhibited during cognitive processes such as learning and memory formation. Furthermore, all spiking activity would be naturally generated and would not rely on any electrophysiological intervention (such as presynaptic stimulation or postsynaptic current injection). The identified plasticity rule would also be conditioned on a natural distribution and large number of spiking intervals. The rule therefore may be more generalizable because it characterizes the operating pair-wise component of plasticity during a complete and wide range of neural activity patterns (as opposed to a constrained set of interval repetitions). Furthermore, STDP identification is based on observations of weight trajectories that are of long duration (i.e., hours) and high resolution (i.e., observations on the millisecond timescale). Estimation with such complex weight trajectories enables investigation into subtle but important plasticity rule assumptions such as weight dependence and spike pairing schemes. These assumptions are important because an absence of weight dependence leads to rapid bimodal saturation and the nearest-neighbor instead of all-to-all spike pairing scheme can relate STDP to BCM.

When applied to in vivo spike train data, plasticity identification would estimate functional connectivity strength as opposed to synaptic connectivity strength, since the recorded input and output neurons may or may not be synaptically connected. Nevertheless, the identified plasticity rule can still yield insights into the effect of activity-dependent plasticity on the signal transformational properties of a neural ensemble. Furthermore, the identified plasticity rule might be used to extend the current stationary MIMO models used in the hippocampal memory prostheses to nonstationary, self-organizing MIMO models for the development of next-generation, adaptive cortical neural prostheses.

Analysis of the exact solution to the ordinary differential equation describing weight change yields insights into the persistence of weight and the nonlinear nature of the implemented STDP model. The simulation and estimation presented previously is iterative with a discrete time step of 1 ms. As the time step decreases, the discrete representation for weight in equation 8 approaches a continuous description as shown below in Equation 28.

$$\frac{dg}{dt} = \Delta g_{xy}(t) + \Delta g_{yx}(t)g(t) \qquad \text{Equation 28}$$

The continuous description of weight provided in Equation 28 is an ordinary differential equation with an exact solution given by Equation 29 below.

$$g(t) = e^{\int_{t_0}^{t} \Delta g_{yx}(\tau)d\tau}\left[\int_{t_0}^{t} e^{\int_{t_0}^{\lambda} \Delta g_{yx}(\epsilon)d\epsilon} \Delta g_{xy}(\lambda)d\lambda + g_0\right] \qquad \text{Equation 29}$$

A discrete representation of the exact solution is shown in Equations 30 and 31 below.

$$g(t) = \underbrace{g_0 e^{g_{yx}(t_0,t)}}_{g_s(t)} + \underbrace{\sum_{\tau=t_0}^{t} \Delta g_{xy}(\tau)e^{g_{yx}(\tau,t)}}_{g_d(t)} \qquad \text{Equation 30}$$

$$g_{yx}(t_0, t) = \sum_{\tau=t_0}^{t} \Delta g_{yx}(\tau) \qquad \text{Equation 31}$$

The current weight, g(t), can be broken down into a static component, $g_s(t)$, which is the contribution from the initial weight, and a dynamic component, $g_d(t)$, which is the contribution from potentiating changes in weight, $\Delta g_{xy}(\tau)$. Inspection of $g_s(t)$ shows that the contribution of the starting weight, g0, to the current weight, g(t), is diminished exponentially by the sum of all depressive changes in weight between the initial time, $t_0$, and the current time t. Similarly, as seen in $g_d(t)$, the contribution to the current weight, from a past time step's potentiating change in weight, $\Delta g_{xy}(\tau)$, is diminished by all depressive changes in weight between that time step, $\tau$, and the current time, t.

In FIG. 13, computations of $g_s(t)$ for several simulations show that the contribution of initial weight is relatively short-lived, (the average amount of time for $g_s(t)$ to reduce to less than 10% of its initial value, or $\tau_{90}$, is 142 s or less in all analyzed parameter sets). This rate of decay, however, is influenced by the simulation parameters. Higher-frequency Poisson input quickens the decay compared to natural bursting input, ($\tau_{90}$=14 s versus 96 s, respectively). Higher background firing rates also cause quicker decays ($\tau_{90}$=142 s, 96 s, and 51 s for background firing rates of 2.1 Hz, 3.8 Hz, and 6.2 Hz respectively).

FIG. 13 illustrates a comparison of the decay of the initial weight contribution for several parameters. All plotted $g_s(t)$/$g_0$ traces are the average of 10 trials. A illustrates that bursting input has an average firing rate of 0.76 Hz versus 5 Hz for Poisson input. B illustrates that background firing rates, $f_B$, are controlled by modifying the simulation noise level, $\sigma$.

These general trends are expected, where at higher rates of input and output firing, there is more weight modification and the persistence of the starting weight is diminished. The rapid decay of $g_s(t)$ explains errors in the estimation of $g_0$ and demonstrates that increasing the length of data used for fitting will not lead to better $g_0$ estimates. Furthermore, especially for fits with longer data, estimation could be simplified by omitting the effect of $g_0$ entirely. Currently, the model used for estimation uses the full spiking history for g(t); however, improvements to the capability and speed of estimation may be enhanced only by considering a certain memory window that encompasses spike history that contributes substantially to the current weight.

As can be seen in Equation 30, the same term that dictates the decay of the effect of the initial weight is also applied to the change in weight from the STDP rule at each time step. Therefore, conclusions about the persistence of the initial weight are also generalizable to the persistence in weight change caused at each time step by the STDP plasticity rule.

Expression of the exact solution also gives more insight into the nonlinear nature of the weight equation and challenges in coefficient estimation. In Equation 30, the potentiation changes caused by $\Delta g_{xy}$ are balanced by $\Delta g_{yx}$. Therefore, local solution optima may exist where the magnitudes of $\Delta g_{xy}$ and $\Delta g_{yx}$ are both larger or smaller than ideal values. Also, the nonlinearities involved in plasticity coefficient estimation can be seen by applying basis function decomposition from Equations 16 and 17 with Equation 31 into Equation 30 to express $g_d(t)$ as shown in Equation 32 below.

$$g_d(t) = \sum_{\tau=t_0}^{t} c_{A_{xy}}^T V_{xy}(\tau)c_{I_{xy}} e^{\sum_{\lambda=\tau}^{t} c_{A_{yx}}^T V_{yx}(\lambda)c_{I_{yx}}} \qquad \text{Equation 32}$$

Coefficients $c_{A_{xy}}$ and $c_{I_{xy}}$ are linearly separable and can therefore be estimated as part of a GLM. However, $c_{A_{yx}}$ and $c_{I_{yx}}$ are in exponential functions that are separately summed at each time step, which precludes use of the GLM and necessitates the use of unconstrained optimization. Overall, expression of the exact weight solution in Equation 30 allows further inspection of the dynamics of the implemented STDP rule, including weight persistence, as well as insights into estimation challenges and potential improvements.

In the minimal model considered in other methods, results from triplet and quadruplet experimental protocols can be captured by considering triplet sequences that end with a postsynaptic spike. These triplets can be formulated in the model of the present disclosure by expanding the pairwise STDP amplitude function $A_{xy}(\Delta t)$ to a triplet function $A_{x2y}(\Delta t_x, \Delta t_y)$, where $\Delta t_x = t_{y_2} - t_x$ and $\Delta t_y = t_{y_2} - t_{y_1}$. To fit $A_{x2y}$ directly to spiking activity, however, and without assuming a strict function shape, $A_{x2y}$ can be expressed as shown below in Equation 33.

$$A_{x2y}(\Delta t_x, \Delta t_y) = A_{xy}(\Delta t_x) A_{yy}(\Delta t_y) \quad \text{Equation 33:}$$

Likewise, $A_{x2y}$ may be approximated bilinearly with basis function decomposition as shown in Equation 34 below.

$$A_{x2y}(\Delta t_x, \Delta t_y) = \sum_{j_x=1}^{L_A} c_{A_{xy}}^{(j_x)} b_{j_x}(\Delta t_x) \sum_{j_y=1}^{L_A} c_{A_{yy}}^{(j_y)} b_{j_y}(\Delta t_y) \quad \text{Equation 34}$$

When incorporated into the entire estimation procedure, the only extra parameters to estimate would be $c_{A_{yy}}$, which could be captured by augmenting the model in Equation 23 with an extra multilinear dimension (four instead of three). These extra parameters, $c_{A_{yy}}$ could be estimated by adding an extra step in the iteration structure after the estimation of $c_{A_{xy}}$ above.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for estimating output neuron spikes based on input-output spike data that includes input spike data and corresponding output spike data, comprising:
   estimating functional spike-timing-dependent plasticity (STDP) parameters, comprising amplitude functions and STDP induction functions, from the input-output spike data, wherein the input-output spike data comprises spike timing, wherein the amplitude function is based on the interval between a presynaptic spike and a post synaptic spike, wherein the induction functions describe an induction time course of plasticity and are respectively scaled by the amplitude functions;
   determining at least one weight value based on the STDP parameters;
   formulating, using a controller, a spiking neuron model structure based on the estimated functional spike-timing-dependent plasticity (STDP) parameters, wherein the spiking neuron model comprises the at least one weight value that characterizes plastic properties including at least one neural functional connectivity strength of a neuron based on the functional STDP parameters;
   receiving, by the controller, at least one input spike train; and
   estimating, using the controller, at least one output spike train that corresponds to the at least one input spike train by applying the at least one weight value to a feedforward kernel that estimates the at least one output spike train based on the at least one input spike train and the at least one weight value.

2. The method of claim 1 wherein formulating the at least one weight value includes formulating plastic amplitude properties and formulating plastic induction properties of the neuron.

3. The method of claim 1 wherein formulating the at least one weight value further includes formulating the at least one weight value to be a positive value regardless of whether an input spike occurs prior to a corresponding output spike or the input spike occurs after the corresponding output spike.

4. The method of claim 1 wherein formulating the at least one weight value includes formulating a first set of plastic properties in response to an input spike occurring prior to a corresponding output spike, and formulating a second set of plastic properties in response to the input spike occurring after the corresponding output spike.

5. The method of claim 1 wherein estimating the at least one output spike train further includes estimating the at least one output spike train based on data from a feedback kernel that estimates values based on a previous output spike train.

6. The method of claim 5 wherein estimating the at least one output spike train further includes estimating that the at least one output spike train includes an output spike in response to data from the feedforward kernel and data from the feedback kernel reaching or exceeding a threshold spike value.

7. The method of claim 1 wherein formulating the at least one weight value that characterizes the plastic properties of the neuron is performed such that a difference in timing between an input spike and an output spike determines an amplitude of a change in the at least one weight value.

8. A method for estimating output neuron spiking activity based on input-output spike data that includes input spike data and corresponding output spike data, comprising:
   formulating a computational framework for estimating functional spike-timing-dependent plasticity (STDP) parameters, comprising:
      formulating a flexible spiking neuron model structure with STDP including stationary functions that characterize stationary properties of a neuron and plastic functions that characterize plastic properties of the neuron, the plastic properties including at least one neural functional connectivity strength;
      observing input-output spike data that includes input spike data and corresponding output spike data;
      estimating the functional STDP parameters, comprising amplitude functions and STDP induction functions, based on the input-output spike data, wherein the input-output spike data comprises spike timing, wherein the amplitude function is based on the interval between a presynaptic spike and a post synaptic spike, wherein the induction functions describe an induction time course of plasticity and are respectively scaled by the amplitude functions;
   determining at least one weight value based on the STDP parameters;
      formulating an estimation technique and applying the estimation technique using the input-output spike data to identify parameters that increase a likelihood of observing output spiking activity;

providing at least one output spike train using the identified parameters from the estimation technique that involves use of a feedforward kernel.

9. The method of claim 8 wherein formulating the flexible spiking neuron model structure with STDP includes:
   formulating a spiking neuron model structure that generates an output spike in response to a membrane potential reaching or exceeding a threshold potential; and
   formulating a STDP plasticity model structure that models an amplitude of change in weight as a function of intervals between input-output spike pairs or multiple combinations of input and output spikes.

10. The method of claim 9 wherein formulating the spiking neuron model structure includes formulating the spiking neuron model structure to:
   create a sum of a feedforward component, a feedback component, and a Gaussian white noise component; and
   compare the sum to the threshold potential to create output spike data.

11. The method of claim 9 wherein formulating the STDP plasticity model structure includes formulating the STDP plasticity model structure to:
   measure the intervals between the input-output spike pairs or the multiple combinations of input and output spikes; and
   determine any change in weight of the input-output spike pairs or the multiple combinations of input and output spikes based on the intervals.

12. The method of claim 11 wherein formulating the STDP plasticity model structure further includes formulating the STDP plasticity model structure to determine synaptic weight fluctuations.

13. The method of claim 8 wherein formulating the estimation technique includes formulating the estimation technique to approximate each of the plastic functions as a weighted summation of a set of basis functions.

14. The method of claim 8 wherein the plastic functions include functions for prolonged induction of STDP.

15. The method of claim 8 wherein applying the estimation technique includes iteratively applying the estimation technique to address nonlinear dependence of model parameters on synaptic weight.

16. The method of claim 8 wherein the flexible spiking neuron model structure with STDP characterizes how the input-output spike data influence functional connectivity strength over time.

17. A system for estimating output neuron spikes, comprising:
   an input device or an input port configured to receive input-output spike data comprising spike timing that includes input spike data and corresponding output spike data that is used for creating a spiking neuron model structure with adjustable functional spike-timing-dependent plasticity (STDP) parameters, comprising amplitude functions and STDP induction functions, wherein the amplitude function is based on the interval between a presynaptic spike and a post synaptic spike, wherein the induction functions describe an induction time course of plasticity and are respectively scaled by the amplitude functions; and
   a controller configured to create the spiking neuron model structure by:
      formulating a weight value that characterizes plastic properties including at least one neural functional connectivity strength of the neuron based on functional STDP parameters which are estimated based on the input-output spike data,
      receiving an input spike train, and
      estimating an output spike train that corresponds to the input spike train by applying the weight value to a feedforward kernel that estimates the output spike train based on the input spike train and the weight value.

18. The system of claim 17 wherein the controller is further configured to formulate the weight value by formulating plastic amplitude properties and formulating plastic induction properties of the neuron.

19. The system of claim 17 wherein the controller is further configured to formulate the weight value to be a positive value regardless of whether an input spike occurs prior to a corresponding output spike or vice versa.

20. The system of claim 17 wherein the controller is further configured to formulate the weight value by formulating a first set of plastic properties in response to an input spike occurring prior to a corresponding output spike, and formulating a second set of plastic properties in response to the input spike occurring after the corresponding output spike.

* * * * *